US012621833B2

(12) United States Patent
Dimou et al.

(10) Patent No.: US 12,621,833 B2
(45) Date of Patent: May 5, 2026

(54) TRANSMISSION OF DEFERRED SPS HARQ FEEDBACK COINCIDING WITH CURRENT PUCCH

(71) Applicant: QUALCOMM Incorporated, San Diego, CA (US)

(72) Inventors: Konstantinos Dimou, New York, NY (US); Yan Zhou, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 439 days.

(21) Appl. No.: 18/037,747

(22) PCT Filed: Jan. 20, 2022

(86) PCT No.: PCT/US2022/013172
§ 371 (c)(1),
(2) Date: May 18, 2023

(87) PCT Pub. No.: WO2022/164711
PCT Pub. Date: Aug. 4, 2022

(65) Prior Publication Data
US 2023/0422250 A1     Dec. 28, 2023

(30) Foreign Application Priority Data

Jan. 29, 2021    (GR) .............................. 20210100055

(51) Int. Cl.
*H04W 72/21*         (2023.01)
*H04B 7/06*          (2006.01)
(Continued)

(52) U.S. Cl.
CPC .......... *H04W 72/21* (2023.01); *H04B 7/0626* (2013.01); *H04L 1/1812* (2013.01); *H04W 72/11* (2023.01)

(58) Field of Classification Search
None
See application file for complete search history.

(56) References Cited

U.S. PATENT DOCUMENTS 11,611,412 B2 *   3/2023  Takeda ................. H04L 1/1825
2017/0041923 A1 *  2/2017  Park ..................... H04L 1/1671
(Continued)

FOREIGN PATENT DOCUMENTS

CN          111226409 A      6/2020

OTHER PUBLICATIONS

International Search Report and Written Opinion—PCT/US2022/013172—ISA/EPO—May 9, 2022.
(Continued)

*Primary Examiner* — Hassan A Phillips
*Assistant Examiner* — Gautam Sharma
(74) *Attorney, Agent, or Firm* — Procopio, Cory, Gargreaves & Savitch LLP

(57)          ABSTRACT

Method and apparatus to defer transmission of HARQ-ACK feedback that overlaps a DL symbol. The apparatus determines to transmit PUCCH SPS HARQ-ACK feedback in response to a received semi-persistently scheduled PDSCH. The apparatus determines that the transmission of the SPS PUCCH HARQ-ACK feedback would overlap with a DL symbol. The transmission of the SPS PUCCH HARQ-ACK feedback is deferred to another UL symbol if the transmission of the SPS PUCCH HARQ-ACK feedback overlaps with the DL symbol. The apparatus transmits, based on the determination that the SPS PUCCH HARQ-ACK feedback would overlap with a DL symbol, a deferred SPS PUCCH HARQ-ACK feedback in one of a next set of available UL symbols or concurrently with a PUCCH HARQ-ACK feedback transmission in a next dynamically scheduled PUCCH (Continued)

*Figure with slot format diagrams: 400, 402 BS, 404 UE, 410, 412, 414 ACK, 406 PDSCH, 408 PUCCH, 416 HARQ ACK/NACK collision.* after the DL symbol based on a deferred feedback configuration configured to define PUCCH content.

19 Claims, 16 Drawing Sheets

(51) Int. Cl.
    *H04L 1/1812*        (2023.01)
    *H04W 72/11*        (2023.01)

(56)                References Cited

U.S. PATENT DOCUMENTS

| | | | |
|---|---|---|---|
| 2020/0228248 A1* | 7/2020 | Islam | H04L 5/0055 |
| 2022/0038218 A1* | 2/2022 | Kim | H04L 1/1854 |
| 2022/0046677 A1* | 2/2022 | Talarico | H04W 72/23 |
| 2022/0094479 A1* | 3/2022 | Gao | H04L 5/0057 |
| 2022/0095337 A1* | 3/2022 | Wang | H04L 5/0053 |
| 2022/0182899 A1* | 6/2022 | Li | H04W 36/08 |
| 2022/0183038 A1* | 6/2022 | Saber | H04L 1/1854 |
| 2022/0278809 A1* | 9/2022 | Papasakellariou | H04L 1/1614 |
| 2022/0399979 A1* | 12/2022 | Gao | H04L 1/1614 |
| 2023/0246765 A1* | 8/2023 | Rico Alvarino | H04L 5/0048 |
| | | | 370/330 |
| 2024/0023081 A1* | 1/2024 | Kumagai | H04L 5/0055 |

OTHER PUBLICATIONS

Moderator (Nokia): "Moderator Summary #1 on HARQ-ACK Feedback Enhancements for NR Rel-17 URLLC/IIoT (AI 8.3.1.1)", 3GPP TSG-RAN WG1 Meeting #104-e, 3GPP Draft, R1-2101817, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2020-Feb. 5, 2020, Jan. 26, 2021 (Jan. 26, 2021), pp. 1-51, XP051975918.

NEC: "UE Feedback Enhancements for HARQ-ACK", 3GPP TSG RAN WG1 #104-e, R1-2100948, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, pp. 1-15, Jan. 19, 2021, XP051971287.

NTT Docomo., et al., "Discussion on HARQ-ACK Feedback Enhancements for Rel.17 URLLC", 3GPP TSG RAN WG1 #104-e, R1-2101612, 3rd Generation Partnership Project, Mobile Competence Centre, 650, Route Des Lucioles, F-06921 Sophia-Antipolis Cedex, France, vol. Ran WG1, No. e-Meeting, Jan. 25, 2021-Feb. 5, 2021, 10 Pages, Jan. 19, 2021, XP051971767, pp. 1-4.

Vivo: "HARQ-ACK Enhancements for Rel-17 URLLC", 3GPP TSG RAN WG1#104-e, 3GPP Draft, R1-2100436, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2020, Jan. 18, 2021 (Jan. 18, 2021), 8 Pages, XP051970358.

* cited by examiner

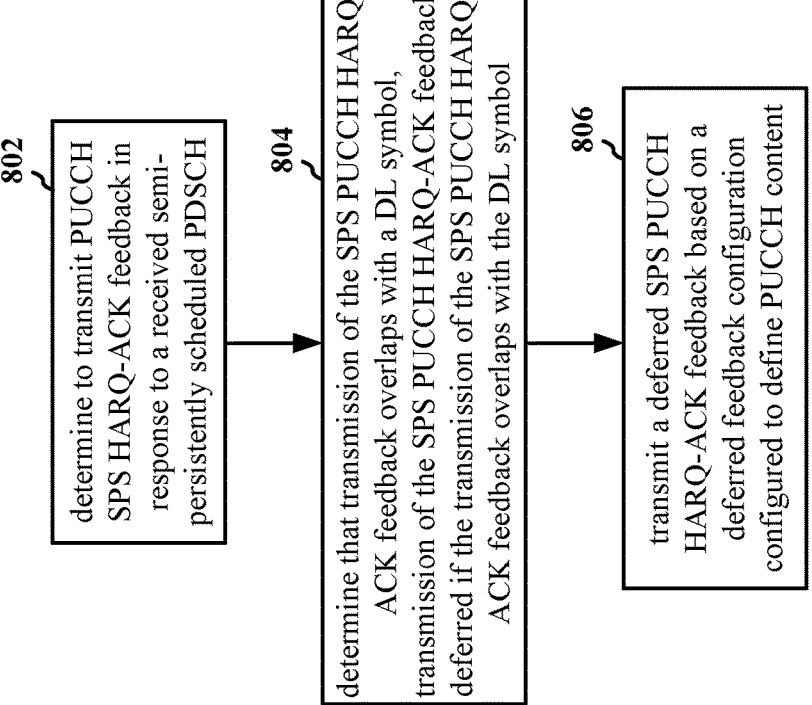

802 determine to transmit PUCCH SPS HARQ-ACK feedback in response to a received semi-persistently scheduled PDSCH

804 determine that transmission of the SPS PUCCH HARQ-ACK feedback overlaps with a DL symbol, transmission of the SPS PUCCH HARQ-ACK feedback deferred if the transmission of the SPS PUCCH HARQ-ACK feedback overlaps with the DL symbol

806 transmit a deferred SPS PUCCH HARQ-ACK feedback based on a deferred feedback configuration configured to define PUCCH content

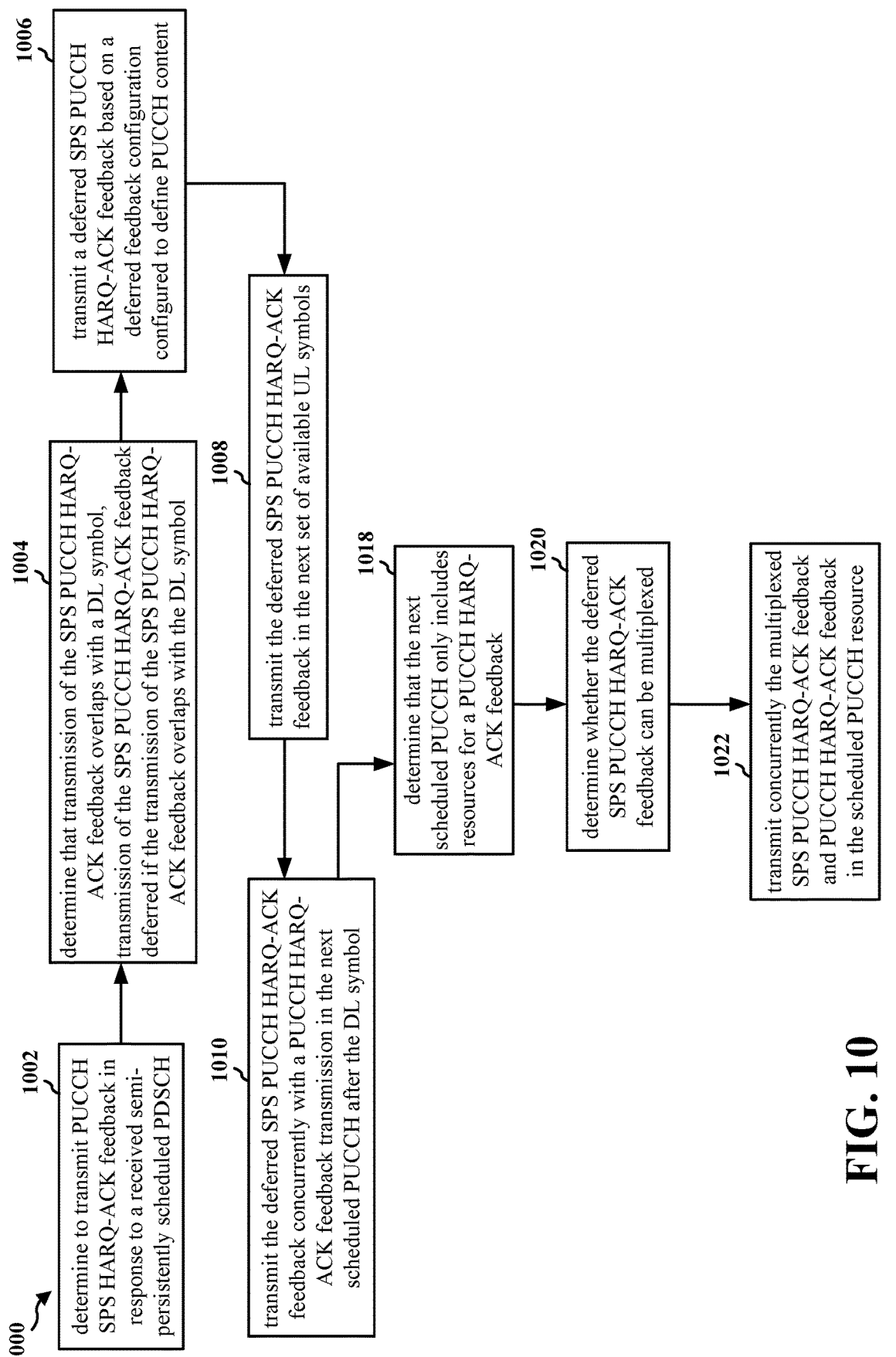

1002 determine to transmit PUCCH SPS HARQ-ACK feedback in response to a received semi-persistently scheduled PDSCH 1004 determine that transmission of the SPS PUCCH HARQ-ACK feedback overlaps with a DL symbol, transmission of the SPS PUCCH HARQ-ACK feedback deferred if the transmission of the SPS PUCCH HARQ-ACK feedback overlaps with the DL symbol 1006 transmit a deferred SPS PUCCH HARQ-ACK feedback based on a deferred feedback configuration configured to define PUCCH content 1008 transmit the deferred SPS PUCCH HARQ-ACK feedback in the next set of available UL symbols 1010 transmit the deferred SPS PUCCH HARQ-ACK feedback concurrently with a PUCCH HARQ-ACK feedback transmission in the next scheduled PUCCH after the DL symbol 1018 determine that the next scheduled PUCCH only includes resources for a PUCCH HARQ-ACK feedback 1020 determine whether the deferred SPS PUCCH HARQ-ACK feedback can be multiplexed 1022 transmit concurrently the multiplexed SPS PUCCH HARQ-ACK feedback and PUCCH HARQ-ACK feedback in the scheduled PUCCH resource

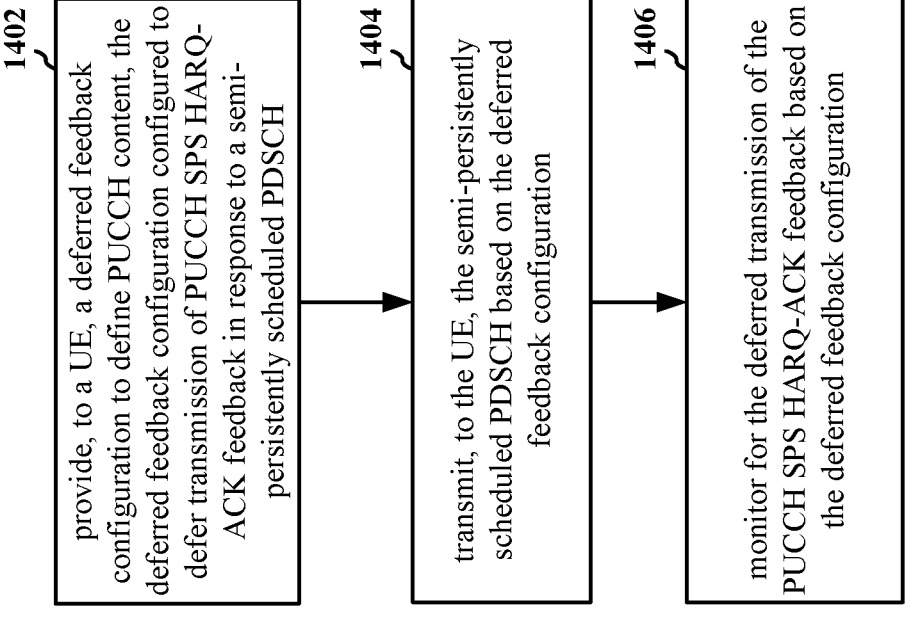

1402 provide, to a UE, a deferred feedback configuration to define PUCCH content, the deferred feedback configuration configured to defer transmission of PUCCH SPS HARQ-ACK feedback in response to a semi-persistently scheduled PDSCH

1404 transmit, to the UE, the semi-persistently scheduled PDSCH based on the deferred feedback configuration

1406 monitor for the deferred transmission of the PUCCH SPS HARQ-ACK feedback based on the deferred feedback configuration

TRANSMISSION OF DEFERRED SPS HARQ FEEDBACK COINCIDING WITH CURRENT PUCCH

CROSS REFERENCE TO RELATED APPLICATION(S)

This application is a National Stage Application filed under 35 U.S.C. § 371 of PCT International Application No. PCT/US2022/013172, entitled "Transmission of Deferred SPS HARQ Feedback Coinciding with Current PUCCH" and filed Jan. 20, 2022, which claims the benefit of and priority to Greek application No. 20210100055, entitled "Transmission of Deferred SPS HARQ Feedback Coinciding with Current PUCCH" and filed on Jan. 29, 2021, which are expressly incorporated by reference herein in their entirety.

TECHNICAL FIELD

The present disclosure relates generally to communication systems, and more particularly, to a configuration for the transmission of deferred semi-persistent scheduling (SPS) hybrid automatic repeat request (HARQ) feedback in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus determines to transmit physical uplink control channel (PUCCH) semi-persistent scheduling (SPS) hybrid automatic repeat request (HARD) acknowledgment (ACK) (HARQ-ACK) feedback in response to a received semi-persistently scheduled physical downlink shared channel (PDSCH). The apparatus determines that the transmission of the SPS PUCCH HARQ-ACK feedback would overlap with a downlink (DL) symbol, wherein the transmission of the SPS PUCCH HARQ-ACK feedback is deferred to another uplink (UL) symbol if the transmission of the SPS PUCCH HARQ-ACK feedback overlaps with the DL symbol. The apparatus transmits, based on the determination that the SPS PUCCH HARQ-ACK feedback would overlap with a DL symbol, a deferred SPS PUCCH HARQ-ACK feedback in one of a next set of available UL symbols or concurrently with a PUCCH HARQ-ACK feedback transmission in a next dynamically scheduled PUCCH after the DL symbol based on a deferred feedback configuration configured to define PUCCH content.

In an aspect of the disclosure, a method, a computer-readable medium, and an apparatus are provided. The apparatus may be a device at a base station. The device may be a processor and/or a modem at a base station or the base station itself. The apparatus provides, to a user equipment (UE), a deferred feedback configuration to define PUCCH content, the deferred feedback configuration configured to defer transmission of physical uplink control channel (PUCCH) semi-persistent scheduling (SPS) hybrid automatic repeat request (HARD) acknowledgment (ACK) (HARQ-ACK) feedback in response to a semi-persistently scheduled physical downlink shared channel (PDSCH), wherein transmission of the PUCCH SPS HARQ-ACK feedback is deferred if the transmission collides with a downlink (DL) symbol or a subsequent PUCCH HARQ-ACK feedback transmission in a next dynamically scheduled PUCCH after the DL symbol. The apparatus transmits, to the UE, the semi-persistently scheduled PDSCH based on the deferred feedback configuration. The apparatus monitors for a deferred transmission of the PUCCH SPS HARQ-ACK feedback based on the deferred feedback configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a flowchart of a method of wireless communication.

FIG. 10 is a flowchart of a method of wireless communication.

FIG. 14 is a flowchart of a method of wireless communication.

DETAILED DESCRIPTION

Figure 1:
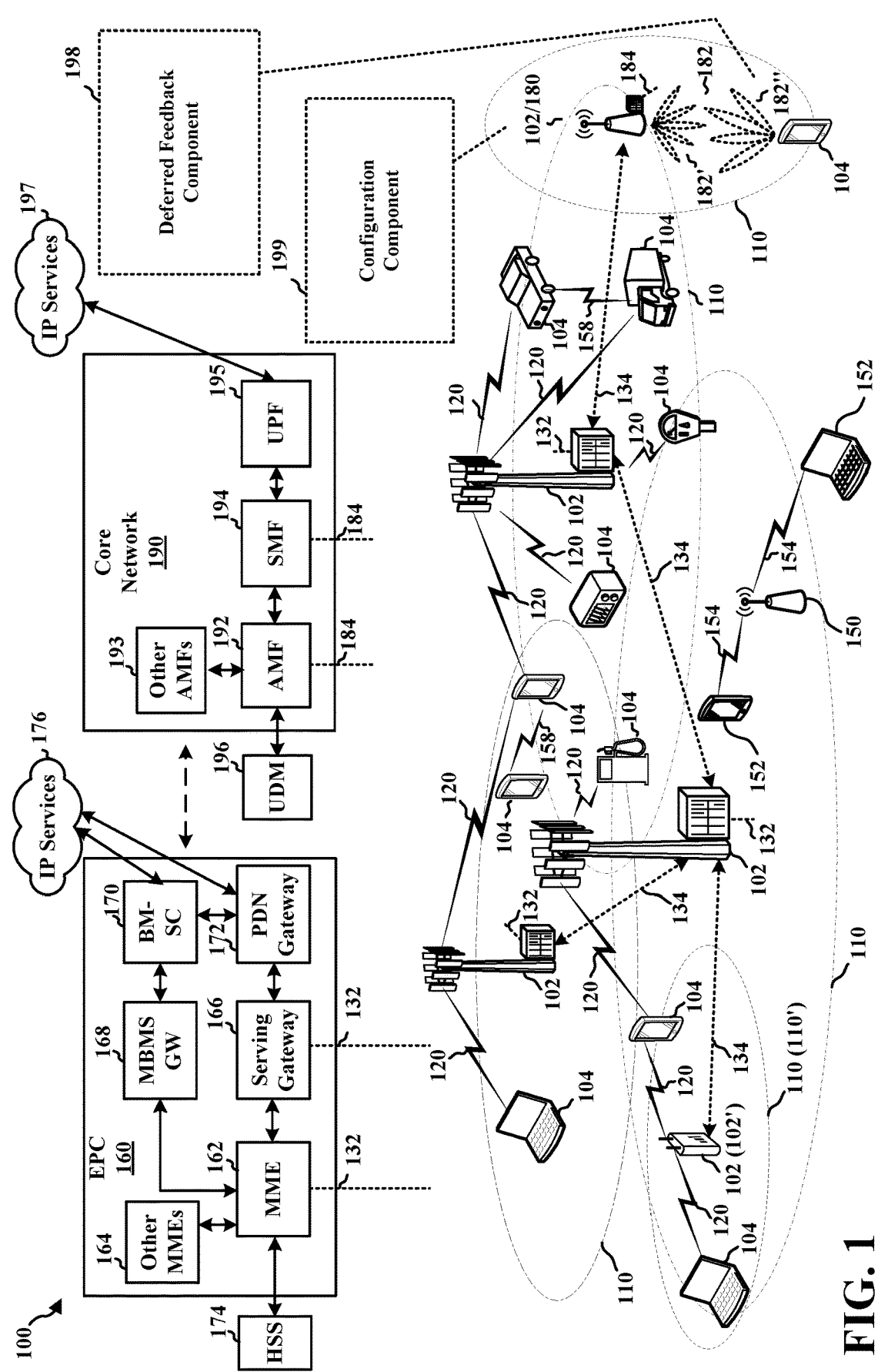
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer. While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to defer transmission of HARQ-ACK feedback that overlaps with a DL symbol based on a deferred feedback configuration. For example, the UE 104 may comprise a deferred feedback component 198 configured to defer transmission of HARQ-ACK feedback that overlaps with a DL symbol based on a deferred feedback configuration. The UE 104 may determine to transmit PUCCH SPS HARQ-ACK feedback in response to a received semi-persistently scheduled PDSCH. The UE 104 may determine that the transmission of the SPS PUCCH HARQ-ACK feedback would overlap with a DL symbol, wherein the transmission of the SPS PUCCH HARQ-ACK feedback is deferred to another UL symbol if the transmission of the SPS PUCCH HARQ-ACK feedback overlaps with the DL symbol. The UE 104 may transmit, based on the determination that the SPS PUCCH HARQ-ACK feedback would overlap with a DL symbol, a deferred SPS PUCCH HARQ-ACK feedback in one of a next set of available UL symbols or concurrently with a PUCCH HARQ-ACK feedback transmission in a next dynamically scheduled PUCCH after the DL symbol based on a deferred feedback configuration configured to define PUCCH content.

Referring again to FIG. 1, in certain aspects, the base station 180 may be configured to configure a UE to defer transmission of HARQ-ACK feedback that overlaps with a DL symbol based on a deferred feedback configuration. For example, the base station 180 may comprise a configuration component 199 configured to configure a UE to defer transmission of HARQ-ACK feedback that overlaps with a DL symbol based on a deferred feedback configuration. The base station 180 may provide, to the UE 104, a deferred feedback configuration to define PUCCH content, the deferred feedback configuration configured to defer transmission of PUCCH SPS HARQ-ACK feedback in response to a semi-persistently scheduled PDSCH, wherein transmission of the PUCCH SPS HARQ-ACK feedback is deferred if the transmission collides with a DL symbol or a subsequent PUCCH HARQ-ACK feedback transmission in a next dynamically scheduled PUCCH after the DL symbol. The base station 180 may transmit, to the UE 104, the semi-persistently scheduled PDSCH based on the deferred feedback configuration. The base station 180 may monitor for a deferred transmission of the PUCCH SPS HARQ-ACK feedback based on the deferred feedback configuration.

Although the following description may be focused on 5G NR, the concepts described herein may be applicable to other similar areas, such as LTE, LTE-A, CDMA, GSM, and other wireless technologies.

Figure 2:
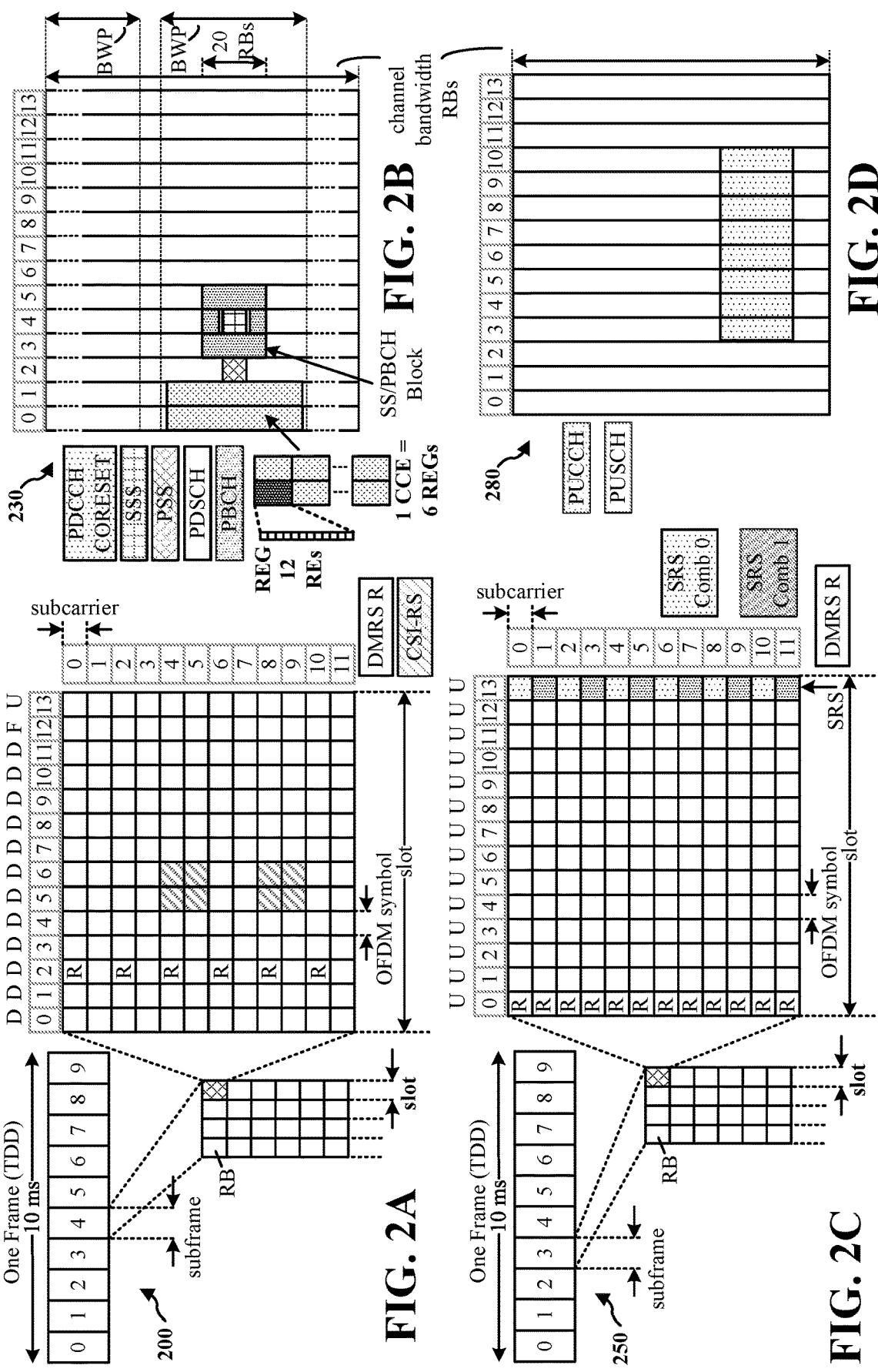
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA)

symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
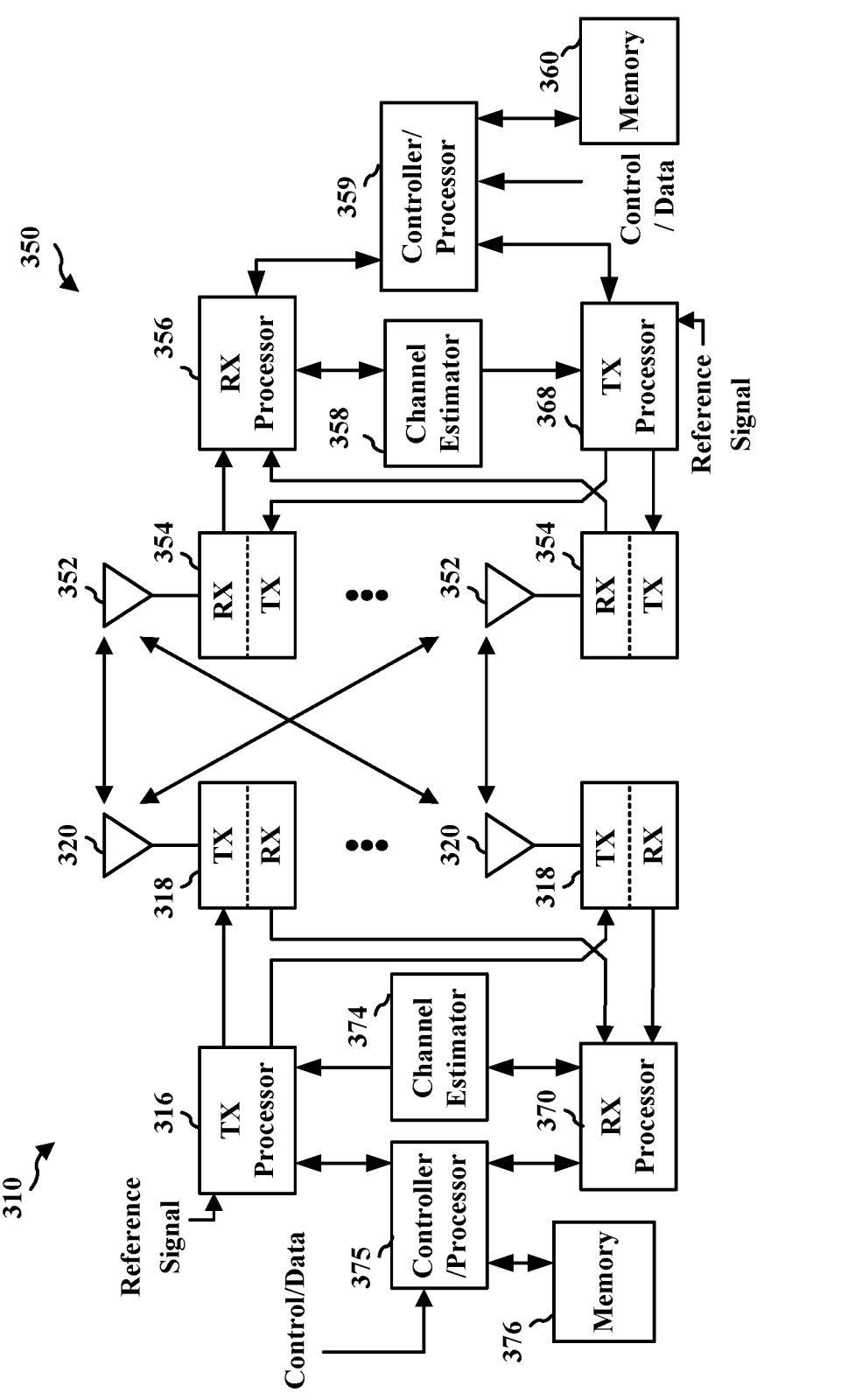
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality. The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
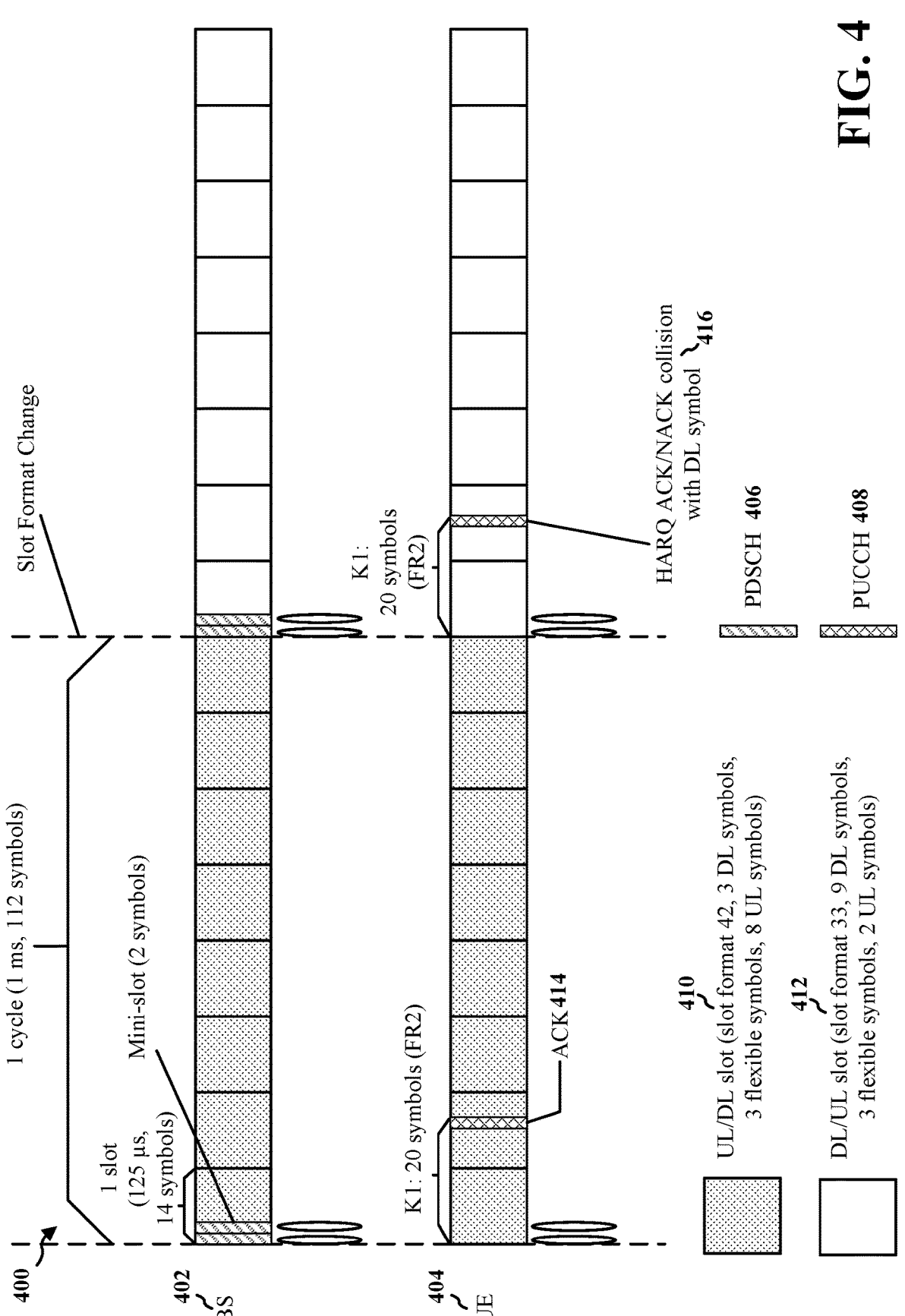
FIG. 4 is a diagram illustrating an example of a HARQ feedback collision with a DL symbol.

FIG. 4 is a diagram 400 illustrating an example of a HARQ feedback collision with a DL symbol. The diagram 400 includes an example of communication between a base station 402 and a UE 404. In some instances, the base station 402 may transmit PDSCH 406 to the UE 404. The UE 404 may receive the PDSCH 406 and may be configured to transmit PUCCH 408 comprising an acknowledgement (ACK) 414 to the base station 402 to acknowledge whether the PDSCH 406 was received or not. The UE 402 may be configured to transmit the ACK 414 based on a HARQ-ACK feedback timeline or offset (e.g., K1). In the diagram 400 of FIG. 4, the UE 404 has a K1 of 20 symbols, such that the UE 402 is scheduled to transmit the ACK 414 with an offset of 20 symbols. The UE 402 may be operating with a slot format that supports the K1 of the UE 402, such that the ACK 414 is scheduled for transmission on an uplink (UL) symbol.

In some instances, a slot format change may occur due to a predetermined pattern or schedule. For example, the network, via the base station 402, may broadcast the slot format change to UEs via an RRC information element (IE) (e.g., SlotFormatCombinationsPerCell). In such instances, the slot format may change from a first slot format 410 (e.g., Slot Format 42) to a second slot format 412 (e.g., Slot Format 33). The first slot format and the second slot format may both comprise a total of 14 slots, for example, but may have different amount of slots (e.g., UL, DL, Flexible). For example, the first slot format (e.g., Slot Format 42) may comprise 3 DL symbols, 3 Flexible symbols, and 8 UL symbols, while the second slot format (e.g., Slot Format 33) may comprise 9 DL symbols, 3 Flexible symbols, and 2 UL symbols. If the UE 404 receives a PDSCH 406, while operating under the second slot format, the K1 offset remains the same (e.g., 20 symbols) and the HARQ ACK/ NACK 416 may be scheduled at a DL symbol, such that the HARQ ACK/NACK 416 would collide with the DL symbol. As such, the UE 404 may not transmit the HARQ ACK/ NACK 416 because the offset K1 of 20 symbols schedules the HARQ ACK/NACK 416 on a DL symbol, which is for downlink communication from the base station.

Figure 5:
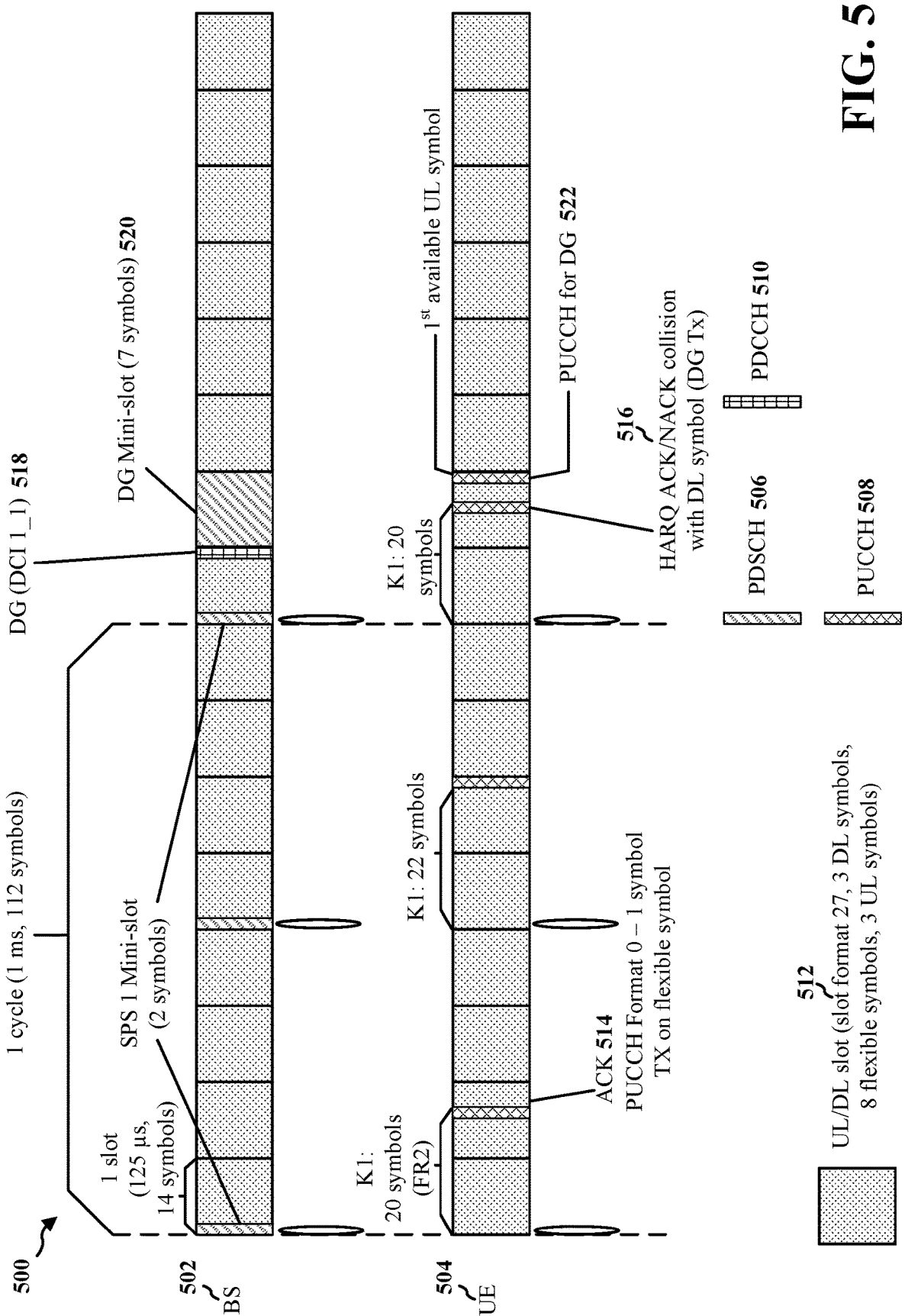
FIG. 5 is a diagram illustrating an example of a HARQ feedback collision with a DL symbol.

FIG. 5 is a diagram 500 illustrating an example of a HARQ feedback collision with a DL symbol. The diagram 500 includes an example of communication between a base station 502 and a UE 504. In the example of diagram 500, the slot format is unchanged, which may allow for ACK 514 to be properly scheduled for transmission at an UL slot. However, in some instances, the base station 502 may transmit a dedicated grant (DG) 518 that has a PUCCH 522 schedule for transmission from the UE at an UL symbol. In some instances, the UE 504 may receive a PDSCH 506 having a different SPS configuration which results in configuring the UE with a different K1 offset (e.g., 22 symbols). The UE 504 may then receive another PDSCH 506 that configures the UE to revert to the original K1 offset of 20, such that the HARQ ACK/NACK 516 collides with a DL symbol, which prevents the UE 504 from transmitting the HARQ ACK/NACK 516. The DL symbol that collides with the HARQ ACK/NACK 516 may be a DL symbol for the downlink transmission of the DG mini-slot 520.

Aspects provided herein provide a configuration to defer transmission of HARQ-ACK feedback that overlaps with a DL symbol. For example, a UE may be configured with a deferred feedback configuration configured to defer the transmission of PUCCH SPS HARQ-ACK feedback. The deferred feedback configuration may configure the UE to defer transmission of the PUCCH SPS HARQ-ACK feedback under different conditions when the transmission of the PUCCH SPS HARQ-ACK feedback would overlap with a DL symbol. At least one advantage of the disclosure is that the deferred feedback configuration may allow the UE to defer the transmission of the PUCCH SPS HARQ-ACK feedback to the first available PUCCH and/or UL symbol(s). At least another advantage of the disclosure is that the deferred feedback configuration may allow the UE to defer the transmission of the PUCCH SPS HARQ-ACK feedback to an Nth available PUCCH resource or an Nth available UL slot, which may assist in avoid in overloading the first available PUCCH and/or UL symbol(s).

Figure 6:
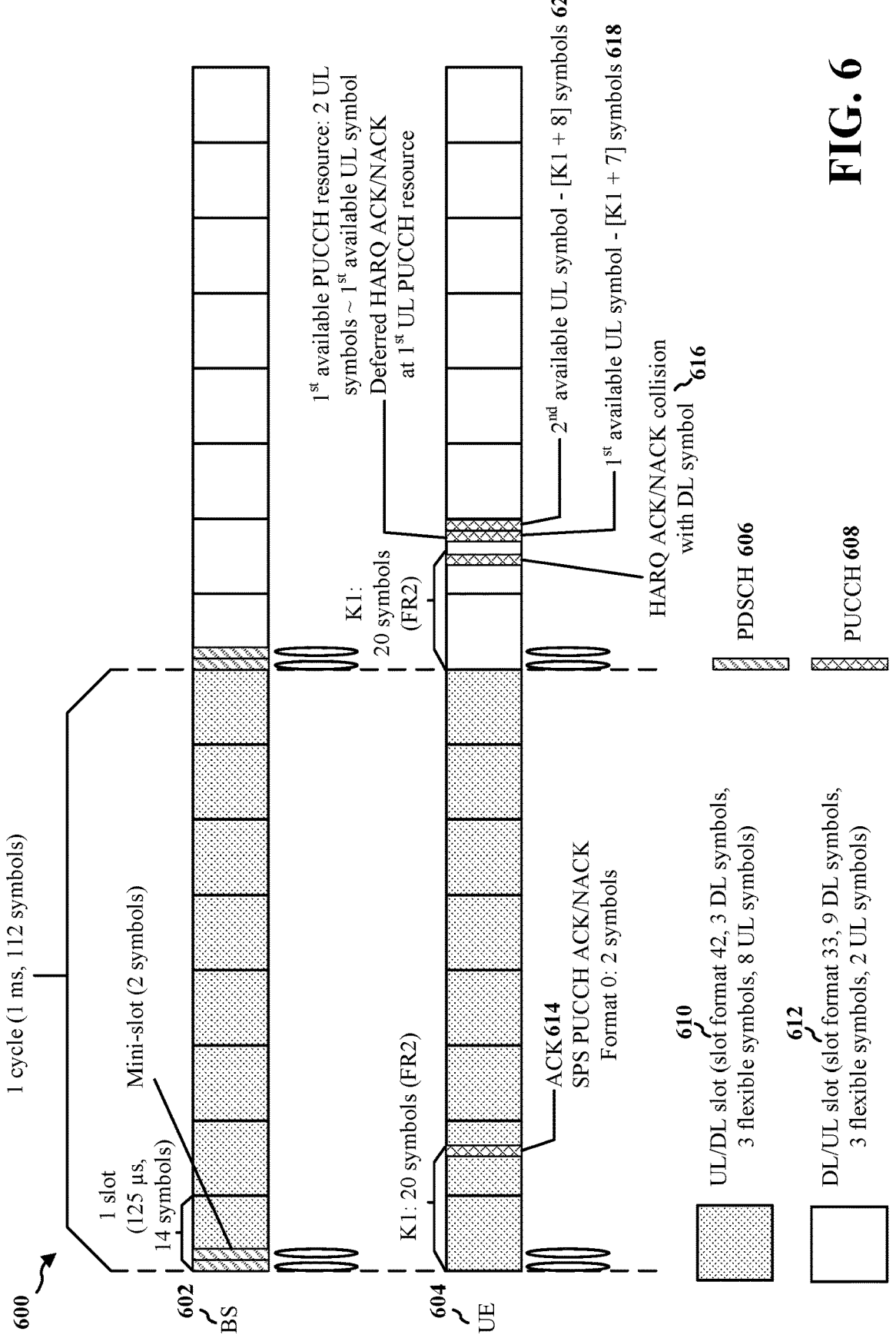
FIG. 6 is a diagram illustrating an example of a configuration for transmission of deferred HARQ feedback.

FIG. 6 is a diagram 600 illustrating an example of a configuration for transmission of deferred HARQ feedback. The diagram 600 is similar to diagram 400. The base station 602 may transmit PDSCH 606 to the UE 604. The UE 604 receives the PDSCH 606 and may transmit PUCCH 608 comprising ACK 614 to the base station. The diagram 600 includes a slot format change (e.g., 610, 612), similar to the diagram 400 of FIG. 4, such that a HARQ ACK/NACK 616 may collide with a DL symbol. However, the UE 604 may be configured to defer the transmission of the HARQ ACK/NACK 616 to the first available UL symbol. For example, the UE 604 may defer the transmission of the HARQ ACK/NACK 616 to the first available UL symbol 618, in response to determining that the HARQ ACK/NACK 616 overlaps or collides with the DL symbol. In such an instance, the UE 604 may defer the transmission of the HARQ ACK/NACK 616 to the first available PUCCH resource, which may be K1+7 symbols, for example. The first available PUCCH resource may comprise the first available UL sub-slot or symbols which may carry the exact same PUCCH format of the deferred HARQ ACK/NACK 616 on the exact PRBs and same beam identifier (ID). For example, an SPS PUCCH configuration may include PUCCH Format 0, length 2 symbols, 1 PRB (e.g., #11), Beam ID #3. The first available PUCCH resource may include the first available 2 UL symbols (after the instant of SPS HARQ deferring) and the same PUB (e.g., #11) and the same Beam ID #3 in the new slot or TDD configuration.

In some aspects, the UE 604 may defer the transmission of the HARQ ACK/NACK 616 to another available UL symbol, if the first available UL symbol is not compatible or scheduled to transmit another uplink transmission. For example, the UE 604 may defer the transmission of the HARQ ACK/NACK 616 to the second available UL symbol 620. In yet some aspects, the UE 604 may be configured to defer the transmission of the HARQ ACK/NACK 616 to an Nth available UL symbol.

With reference back to FIG. 5, the HARQ ACK/NACK 516 collides with a DL symbol for the downlink transmission of the DG 518. The UE 504 may be configured to defer the transmission of the HARQ ACK/NACK 516 to the first available UL symbol. However, in the diagram 500 of FIG. 5, the first available UL symbol overlaps with the PUCCH 522 for the DG 518. As such, the UE 504 may be configured to combine the HARQ ACK/NACK 516 with the PUCCH 522.

The UE 504 may be configured with a deferred feedback configuration that configures the UE with a set of rules on how to handle instances where the first available PUCCH coincides with a next scheduled PUCCH. For example, if the next scheduled PUCCH comprises resources for CSI resources for transmitting CSI, the UE may replace the CSI with the deferred feedback (e.g., HARQ ACK/NACK 516 or 616). The UE may then transmit the deferred feedback in the CSI resources concurrently with the HARQ-ACK feedback of the next scheduled PUCCH.

In some aspects, if the next scheduled PUCCH comprises HARQ and CSI resources for transmitting HARQ and CSI, the UE may replace the CSI with the deferred feedback, and transmit PUCCH comprising the deferred feedback multiplexed with the PUCCH HARQ for the next scheduled PUCCH.

In some aspects, if the next scheduled PUCCH only comprises HARQ resources for transmitting HARQ, then the UE may determine if the PUCCH HARQ for the next scheduled PUCCH may be multiplexed with the deferred feedback, based on whether the multiplex payload fits in the existing PUCCH resource. The UE may transmit the PUCCH HARQ for the next scheduled PUCCH multiplexed with the deferred feedback when the PUCCH HARQ for the next scheduled PUCCH may be multiplexed with the deferred feedback. In some aspects, for example when the PUCCH HARQ for the next scheduled PUCCH may not be multiplexed with the deferred feedback, the UE may replace the PUCCH HARQ for the next scheduled PUCCH with the deferred feedback, and drop the PUCCH HARQ for the next scheduled PUCCH, in order to transmit the deferred feedback in the PUCCH HARQ resources for the next scheduled PUCCH. In some aspects, if the PUCCH HARQ for the next scheduled PUCCH may not be multiplexed with the deferred feedback because the multiplexed payload would not fit in the existing PUCCH resource, the UE may multiplex the PUCCH HARQ for the next scheduled PUCCH with the deferred feedback, then estimate the amount of PUCCH resources needed for the new multiplexed payload. The UE may then transmit the new multiplexed payload comprising the PUCCH HARQ for the next scheduled PUCCH multiplexed with the deferred feedback in a PUCCH resource indicator (PRI) which may carry the new multiplex payload or combination. The base station may be configured to monitor for different PRIs per UE, such that that base station may receive the new multiplex payload or combination.

Figure 7:
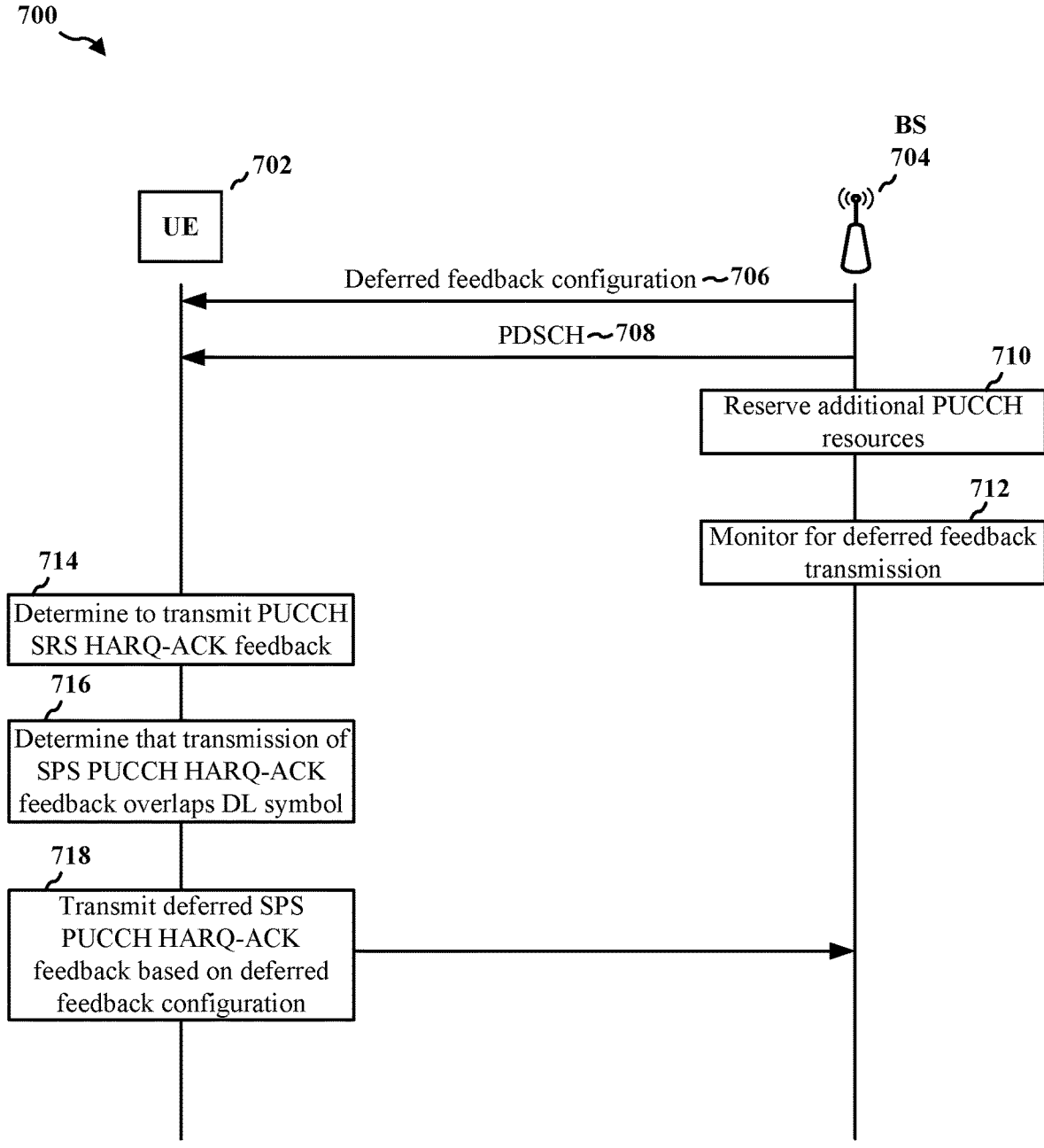
FIG. 7 is a call flow diagram of signaling between a UE and a base station in accordance with certain aspects of the disclosure.

FIG. 7 is a call flow diagram 700 of signaling between a UE 702 and a base station 704. The base station 704 may be configured to provide at least one cell. The UE 702 may be configured to communicate with the base station 704. For example, in the context of FIG. 1, the base station 704 may correspond to base station 102/180 and, accordingly, the cell may include a geographic coverage area 110 in which communication coverage is provided and/or small cell 102' having a coverage area 110'. Further, a UE 702 may correspond to at least UE 104. In another example, in the context of FIG. 3, the base station 704 may correspond to base station 310 and the UE 702 may correspond to UE 350.

As illustrated at 706, the base station 704 may provide, to the UE 702, a deferred feedback configuration to define PUCCH content. The UE 702 may receive the deferred feedback configuration from the base station 704. The deferred feedback configuration may configure the UE 702 to defer transmission of PUCCH SPS HARQ-ACK feedback in response to a semi-persistently scheduled PDSCH, as shown at 708. The transmission of the PUCCH SPS HARQ-ACK feedback may be deferred, based on the deferred feedback configuration, if the transmission the PUCCH SPS HARQ-ACK feedback collides with a DL symbol or a subsequent PUCCH HARQ-ACK feedback transmission in a next dynamically scheduled PUCCH after the DL symbol.

As illustrated at 708, the base station 704 may transmit the semi-persistently scheduled PDSCH to the UE 702. The UE 702 may receive the semi-persistently scheduled PDSCH from the base station 704. The transmission of the semi-persistently scheduled PDSCH from the base station 704 to the UE 702 may be based on the deferred feedback configuration.

In some aspects, for example as illustrated at 710, the base station 704 may reserve additional PUCCH resources to accommodate for a deferred transmission of a PUCCH SPS HARQ-ACK feedback. In some aspects, the additional PUCCH resources may allow for transmission of different payloads comprising the PUCCH SPS HARQ-ACK feedback. In some aspects, the additional PUCCH resources may allow for transmission of a PUCCH format based on a PM.

As illustrated at 712, the base station 704 may monitor for the deferred transmission of the PUCCH SPS HARQ-ACK feedback. The base station 704 may monitor for the deferred transmission of the PUCCH SPS HARQ-ACK feedback based on the deferred feedback configuration.

As illustrated at 714, the UE 702 may determine to transmit PUCCH SPS HARQ-ACK feedback. The UE may determine to transmit PUCCH SPS HARQ-ACK feedback in response to a received semi-persistently scheduled PDSCH.

As illustrated at 716, the UE 702 may determine that the transmission of the SPS PUCCH HARQ-ACK feedback may overlap with a DL symbol. The transmission of the SPS PUCCH HARQ-ACK feedback may be deferred to another UL symbol if the transmission of the SPS PUCCH HARQ-ACK feedback overlaps with the DL symbol. In some aspects, the transmission of the SPS PUCCH HARQ-ACK feedback may overlap with the DL symbol due, in part, to a change of the slot format. The change of the slot format may be based on a pattern or scheduled slot format change. For example, the PDSCH may be received by the UE operating in a first slot format (e.g., Slot Format 42) and having a feedback offset (e.g., K1) that is compatible with the first slot format such that the feedback is scheduled to be transmitted by the UE in an UL slot. However, in some instances, the PDSCH may be received by the UE while operating in a second slot format (e.g., Slot Format 33), such that the feedback offset (K1) is not compatible with the second slot format. As such, the feedback may be scheduled to be transmitted in an DL slot in the second slot format, which would result in a collision with a downlink transmission from the base station. In such instances, the UE may defer transmission of the SPS PUCCH HARQ-ACK feedback to another UL symbol, based on the determination that transmission of the SPS PUCCH HARQ-ACK feedback overlaps with a DL symbol.

As illustrated at 718, the UE 702 may transmit a deferred SPS PUCCH HARQ-ACK feedback. The UE may transmit the deferred SPS PUCCH HARQ-ACK feedback based on the determination that the SPS PUCCH HARQ-ACK feedback overlaps with the DL symbol. The UE may transmit a deferred SPS PUCCH HARQ-ACK feedback in one of a next set of available UL symbols or concurrently with a PUCCH HARQ-ACK feedback transmission in a next dynamically scheduled PUCCH after the DL symbol. The UE may transmit the deferred SPS PUCCH HARQ-ACK feedback based on a deferred feedback configuration configured to define PUCCH content.

In some aspects, the UE 702 may transmit the deferred SPS PUCCH HARQ-ACK feedback in the next set of available UL symbols. The UE may transmit the deferred SPS PUCCH HARQ-ACK feedback, based on the deferred feedback configuration. The deferred feedback configuration may configure the UE to define PUCCH content and transmit the deferred SPS PUCCH HARQ-ACK feedback in the next set of available UL symbols. In some aspects, the next set of available UL symbols may comprise one or more symbols. In some aspects, the deferred SPS PUCCH HARQ-ACK feedback may be transmitted in at least a first available UL symbol of the next set of available UL symbols with a same PUCCH format of the deferred SPS PUCCH HARQ-ACK feedback and having similar PRBs and a similar beam ID.

In some aspects, the UE 702 may transmit the deferred SPS PUCCH HARQ-ACK feedback concurrently with a PUCCH HARQ-ACK feedback transmission. The UE may transmit the deferred SPS PUCCH HARQ-ACK feedback concurrently with a PUCCH HARQ-ACK feedback transmission in the next scheduled PUCCH after the DL symbol. The deferred feedback configuration may configure the UE to define PUCCH content and transmit the deferred SPS PUCCH HARQ-ACK feedback concurrently with the PUCCH HARQ-ACK feedback transmission in the next scheduled PUCCH after the DL symbol.

In some aspects, if transmission of the deferred SPS PUCCH HARQ-ACK feedback overlaps with the next scheduled PUCCH, the UE 702 may determine that the next scheduled PUCCH includes CSI or HARQ resources. In some aspects, the UE may determine that the next scheduled PUCCH includes CSI resources for transmitting CSI. In some aspects, the UE may determine that the next scheduled PUCCH includes HARQ and CSI resources for transmitting HARQ and CSI. The deferred feedback configuration may configure the UE to determine that the next scheduled PUCCH includes CSI or HARQ resources.

In some aspects, the UE 702 may replace the CSI with the deferred SPS PUCCH HARQ-ACK feedback. The UE may replace the CSI with the deferred SPS PUCCH HARQ-ACK feedback in instances where the UE determines that the next scheduled PUCCH includes CSI resources for transmitting CSI. In some aspects, if the UE replaces the CSI with the deferred SPS PUCCH HARQ-ACK feedback, the CSI is dropped. The deferred feedback configuration may configure the UE to replace the CSI with the deferred SPS PUCCH HARQ-ACK feedback.

In some aspects, the UE 702 may transmit the deferred SPS PUCCH HARQ-ACK feedback in the CSI resources concurrently with the PUCCH HARQ-ACK feedback in the scheduled PUCCH. The UE may transmit the deferred SPS PUCCH HARQ-ACK feedback in the CSI resources concurrently with the PUCCH HARQ-ACK feedback in the scheduled PUCCH in instances where the next scheduled PUCCH only includes CSI resources for transmitting CSI. In some aspects, the UE may transmit PUCCH comprising the deferred SPS PUCCH HARQ-ACK feedback multiplexed with the PUCCH HARQ for the next scheduled PUCCH. The UE may transmit PUCCH comprising the deferred SPS PUCCH HARQ-ACK feedback multiplexed with the PUCCH HARQ for the next scheduled PUCCH in instances where the next scheduled PUCCH includes HARQ and CSI resources for transmitting HARQ and CSI. The UE may transmit the deferred SPS PUCCH HARQ-ACK feedback in the CSI resources or multiplexed with the PUCCH HARQ for the next scheduled PUCCH based on the deferred feedback configuration.

In some aspects, if the transmission of the deferred SPS PUCCH HARQ-ACK feedback overlaps with the next scheduled PUCCH, the UE 702 may determine that the next scheduled PUCCH only includes resources for a PUCCH HARQ-ACK feedback for the next scheduled PUCCH. The UE may determine the resource of the next scheduled PUCCH based on the deferred feedback configuration.

In some aspects, the UE 702 may determine whether the deferred SPS PUCCH HARQ-ACK feedback may be multiplexed with the PUCCH HARQ-ACK feedback for the next scheduled PUCCH based on whether the combination the deferred SPS PUCCH HARQ-ACK feedback and the PUCCH HARQ-ACK feedback for the next scheduled PUCCH fit within the existing PUCCH resources. The UE may determine that the deferred SPS PUCCH HARQ-ACK feedback may be multiplexed with the PUCCH HARQ-ACK feedback for the next scheduled PUCCH based on the deferred feedback configuration.

In some aspects, the UE 702 may transmit concurrently the multiplexed SPS PUCCH HARQ-ACK feedback and the PUCCH HARQ-ACK feedback in the scheduled PUCCH resource. The UE may transmit concurrently the multiplexed SPS PUCCH HARQ-ACK feedback and the PUCCH HARQ-ACK feedback in the scheduled PUCCH resource in instances when both the SPS PUCCH HARQ-ACK feedback and the PUCCH HARQ-ACK feedback may be multiplexed into the same scheduled PUCCH resource.

In some aspects, the UE 702 may replace the PUCCH HARQ-ACK feedback for the next scheduled PUCCH with the deferred SPS PUCCH HARQ-ACK feedback when the deferred SPS PUCCH HARQ-ACK feedback cannot be multiplexed with the PUCCH HARQ-ACK feedback for the next scheduled PUCCH. In some aspects, the deferred SPS PUCCH HARQ-ACK feedback cannot be multiplexed with the PUCCH HARQ-ACK feedback for the next scheduled PUCCH due to the combination of feedbacks not being compatible or fitting within the existing PUCCH resource. The UE may replace the PUCCH HARQ-ACK feedback for the next scheduled PUCCH with the deferred SPS PUCCH HARQ-ACK feedback based on the deferred feedback configuration.

In some aspects, the UE 702 may transmit the deferred SPS PUCCH HARQ-ACK feedback in PUCCH resources for the next scheduled PUCCH. In such aspects, the PUCCH HARQ-ACK feedback for the next scheduled PUCCH may be dropped due to PUCCH HARQ-ACK feedback for the next scheduled PUCCH being replaced with the deferred SPS PUCCH HARQ-ACK feedback. The UE may transmit the deferred SPS PUCCH HARQ-ACK feedback in PUCCH resources for the next scheduled PUCCH based on the deferred feedback configuration.

In some aspects, the UE 702 may multiplex the PUCCH HARQ-ACK feedback for the next scheduled PUCCH and the deferred SPS PUCCH HARQ-ACK feedback. The may multiplex the PUCCH HARQ-ACK feedback for the next scheduled PUCCH and the deferred SPS PUCCH HARQ-ACK feedback upon the determination that the deferred SPS PUCCH HARQ-ACK feedback may be multiplexed with the PUCCH HARQ-ACK feedback for the next scheduled PUCCH. The UE may multiplex the PUCCH HARQ-ACK feedback for the next scheduled PUCCH and the deferred SPS PUCCH HARQ-ACK feedback based on the deferred feedback configuration.

In some aspects, the UE 702 may determine an amount of PUCCH resources needed to transmit the PUCCH HARQ-ACK feedback for the next scheduled PUCCH multiplexed with the deferred SPS PUCCH HARQ-ACK feedback. The UE may determine the amount of PUCCH resources needed to transmit the PUCCH HARQ-ACK feedback for the next scheduled PUCCH multiplexed with the deferred SPS PUCCH HARQ-ACK feedback in response to multiplexing the PUCCH HARQ-ACK feedback for the next scheduled PUCCH and the deferred SPS PUCCH HARQ-ACK feedback. The UE may determine the amount of PUCCH resources needed based on the deferred feedback configuration.

In some aspects, the UE 702 may transmit the PUCCH HARQ-ACK feedback for the next scheduled PUCCH multiplexed with the deferred SPS PUCCH HARQ-ACK feedback in a new PUCCH resource based on a PRI. The UE may utilize the new PUCCH resource to transmit the PUCCH HARQ-ACK feedback for the next scheduled PUCCH multiplexed with the deferred SPS PUCCH HARQ-ACK feedback in instances when both the SPS PUCCH HARQ-ACK feedback and the PUCCH HARQ-ACK feedback cannot be multiplexed into the same scheduled PUCCH resource. In some aspects, the PRI comprises resources for a plurality of different payloads, wherein the PM may support transmission of the PUCCH HARQ-ACK feedback for the next scheduled PUCCH multiplexed with the deferred SPS PUCCH HARQ-ACK feedback. For example, the PM may include the new PUCCH resource which may comprise resources for different payloads such that the PUCCH HARQ-ACK feedback for the next scheduled PUCCH multiplexed with the deferred SPS PUCCH HARQ-ACK feedback may be transmitted.

In some aspects, the base station 704 may receive concurrently a multiplexed SPS PUCCH HARQ-ACK feedback and PUCCH HARQ-ACK feedback. The base station may receive the multiplexed SPS PUCCH HARQ-ACK feedback and PUCCH HARQ-ACK feedback in the additional PUCCH resources. The additional PUCCH resources being reserved, by the base station, to accommodate the deferred transmission of the PUCCH SPS HARQ-ACK feedback.

In some aspects, the base station 704 may receive concurrently a multiplex SPS PUCCH HARQ-ACK feedback and PUCCH HARQ-ACK feedback. The base station may receive concurrently the multiplex SPS PUCCH HARQ-ACK feedback and PUCCH HARQ-ACK feedback in the scheduled PUCCH resource.

FIG. 8 is a flowchart 800 of a method of wireless communication. The method may be performed by a UE or a component of a UE (e.g., the UE 104; the apparatus 1302). One or more of the illustrated operations may be omitted, transposed, or contemporaneous. The method may allow a UE to defer transmission of HARQ-ACK feedback that overlaps with a DL symbol based on a deferred feedback configuration.

At 802, the UE may determine to transmit PUCCH SPS HARQ-ACK feedback. For example, 802 may be performed by determination component 1340 of apparatus 1302. The UE may determine to transmit PUCCH SPS HARQ-ACK feedback in response to a received semi-persistently scheduled PDSCH.

At 804, the UE may determine that the transmission of the SPS PUCCH HARQ-ACK feedback may overlap with a DL symbol. For example, 804 may be performed by overlap component 1342 of apparatus 1302. The transmission of the SPS PUCCH HARQ-ACK feedback may be deferred to another UL symbol if the transmission of the SPS PUCCH HARQ-ACK feedback overlaps with the DL symbol. In some aspects, the transmission of the SPS PUCCH HARQ-ACK feedback may overlap with the DL symbol due, in part, to a change of the slot format. The change of the slot format may be based on a pattern or scheduled slot format change. For example, the PDSCH may be received by the UE operating in a first slot format (e.g., Slot Format 42) and having a feedback offset (e.g., K1) that is compatible with the first slot format such that the feedback is scheduled to be transmitted by the UE in an UL slot. However, in some instances, the PDSCH may be received by the UE while operating in a second slot format (e.g., Slot Format 33), such that the feedback offset (K1) is not compatible with the second slot format. As such, the feedback may be scheduled to be transmitted in an DL slot in the second slot format, which would result in a collision with a downlink transmission from the base station. In such instances, the UE may defer transmission of the SPS PUCCH HARQ-ACK feedback to another UL symbol, based on the determination that transmission of the SPS PUCCH HARQ-ACK feedback overlaps with a DL symbol.

At 806, the UE may transmit a deferred SPS PUCCH HARQ-ACK feedback. For example, 806 may be performed by deferred feedback component 1344 of apparatus 1302. The UE may transmit the deferred SPS PUCCH HARQ-ACK feedback based on the determination that the SPS PUCCH HARQ-ACK feedback overlaps with the DL symbol. The UE may transmit a deferred SPS PUCCH HARQ-ACK feedback in one of a next set of available UL symbols or concurrently with a PUCCH HARQ-ACK feedback transmission in a next dynamically scheduled PUCCH after the DL symbol. The UE may transmit the deferred SPS PUCCH HARQ-ACK feedback based on a deferred feedback configuration configured to define PUCCH content.

Figure 9:
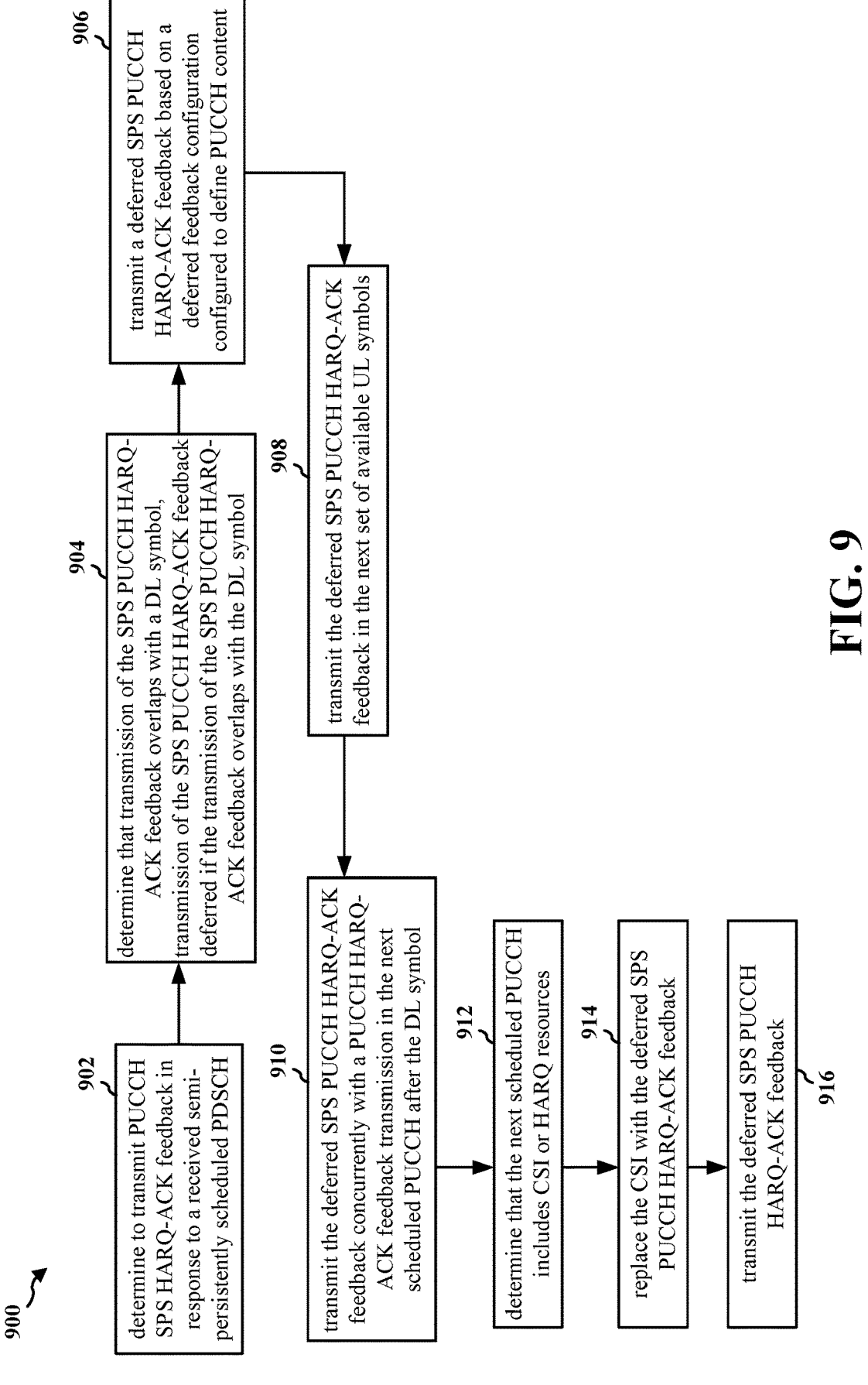
FIG. 9 is a flowchart of a method of wireless communication.

FIG. 9 is a flowchart 900 of a method of wireless communication. The method may be performed by a UE or a component of a UE (e.g., the UE 104; the apparatus 1302). One or more of the illustrated operations may be omitted, transposed, or contemporaneous. The method may allow a UE to defer transmission of HARQ-ACK feedback that overlaps with a DL symbol based on a deferred feedback configuration.

At 902, the UE may determine to transmit PUCCH SPS HARQ-ACK feedback. For example, 902 may be performed by determination component 1340 of apparatus 1302. The UE may determine to transmit PUCCH SPS HARQ-ACK feedback in response to a received semi-persistently scheduled PDSCH.

At 904, the UE may determine that the transmission of the SPS PUCCH HARQ-ACK feedback may overlap with a DL symbol. For example, 904 may be performed by overlap component 1342 of apparatus 1302. The transmission of the SPS PUCCH HARQ-ACK feedback may be deferred to another UL symbol if the transmission of the SPS PUCCH HARQ-ACK feedback overlaps with the DL symbol. In some aspects, the transmission of the SPS PUCCH HARQ-ACK feedback may overlap with the DL symbol due, in part, to a change of the slot format. The change of the slot format may be based on a pattern or scheduled slot format change. For example, the PDSCH may be received by the UE operating in a first slot format (e.g., Slot Format 42) and having a feedback offset (e.g., K1) that is compatible with the first slot format such that the feedback is scheduled to be transmitted by the UE in an UL slot. However, in some instances, the PDSCH may be received by the UE while operating in a second slot format (e.g., Slot Format 33), such that the feedback offset (K1) is not compatible with the second slot format. As such, the feedback may be scheduled to be transmitted in an DL slot in the second slot format, which would result in a collision with a downlink transmission from the base station. In such instances, the UE may defer transmission of the SPS PUCCH HARQ-ACK feedback to another UL symbol, based on the determination that transmission of the SPS PUCCH HARQ-ACK feedback overlaps with a DL symbol.

At 906, the UE may transmit a deferred SPS PUCCH HARQ-ACK feedback. For example, 906 may be performed by deferred feedback component 1344 of apparatus 1302. The UE may transmit the deferred SPS PUCCH HARQ-ACK feedback based on the determination that the SPS PUCCH HARQ-ACK feedback overlaps with the DL symbol. The UE may transmit a deferred SPS PUCCH HARQ-ACK feedback in one of a next set of available UL symbols or concurrently with a PUCCH HARQ-ACK feedback transmission in a next dynamically scheduled PUCCH after the DL symbol. The UE may transmit the deferred SPS PUCCH HARQ-ACK feedback based on a deferred feedback configuration configured to define PUCCH content.

At 908, the UE may transmit the deferred SPS PUCCH HARQ-ACK feedback in the next set of available UL symbols. For example, 908 may be performed by deferred feedback component 1344 of apparatus 1302. The UE may transmit the deferred SPS PUCCH HARQ-ACK feedback, based on the deferred feedback configuration. The deferred feedback configuration may configure the UE to define PUCCH content and transmit the deferred SPS PUCCH HARQ-ACK feedback in the next set of available UL symbols. In some aspects, the next set of available UL symbols may comprise one or more symbols. In some aspects, the deferred SPS PUCCH HARQ-ACK feedback may be transmitted in at least a first available UL symbol of the next set of available UL symbols with a same PUCCH format of the deferred SPS PUCCH HARQ-ACK feedback and having similar PRBs and a similar beam ID.

At 910, the UE may transmit the deferred SPS PUCCH HARQ-ACK feedback concurrently with a PUCCH HARQ-ACK feedback transmission. For example, 910 may be performed by deferred feedback component 1344 of apparatus 1302. The UE may transmit the deferred SPS PUCCH HARQ-ACK feedback concurrently with a PUCCH HARQ-ACK feedback transmission in the next scheduled PUCCH after the DL symbol. The deferred feedback configuration may configure the UE to define PUCCH content and transmit the deferred SPS PUCCH HARQ-ACK feedback concurrently with the PUCCH HARQ-ACK feedback transmission in the next scheduled PUCCH after the DL symbol.

At 912, if transmission of the deferred SPS PUCCH HARQ-ACK feedback overlaps with the next scheduled PUCCH, the UE may determine that the next scheduled PUCCH includes CSI or HARQ resources. For example, 912 may be performed by determination component 1340 of apparatus 1302. In some aspects, the UE may determine that the next scheduled PUCCH includes CSI resources for transmitting CSI. In some aspects, the UE may determine that the next scheduled PUCCH includes HARQ and CSI resources for transmitting HARQ and CSI. The deferred feedback configuration may configure the UE to determine that the next scheduled PUCCH includes CSI or HARQ resources.

At 914, the UE may replace the CSI with the deferred SPS PUCCH HARQ-ACK feedback. For example, 914 may be performed by deferred feedback component 1344 of apparatus 1302. The UE may replace the CSI with the deferred SPS PUCCH HARQ-ACK feedback in instances where the UE determines that the next scheduled PUCCH includes CSI resources for transmitting CSI. In some aspects, if the UE replaces the CSI with the deferred SPS PUCCH HARQ-ACK feedback, the CSI is dropped. The deferred feedback configuration may configure the UE to replace the CSI with the deferred SPS PUCCH HARQ-ACK feedback.

At 916, the UE may transmit the deferred SPS PUCCH HARQ-ACK feedback. For example, 916 may be performed by deferred feedback component 1344 of apparatus 1302. In some aspects, the UE may transmit the deferred SPS PUCCH HARQ-ACK feedback in the CSI resources concurrently with the PUCCH HARQ-ACK feedback in the scheduled PUCCH. The UE may transmit the deferred SPS PUCCH HARQ-ACK feedback in the CSI resources concurrently with the PUCCH HARQ-ACK feedback in the scheduled PUCCH in instances where the next scheduled PUCCH only includes CSI resources for transmitting CSI. In some aspects, the UE may transmit PUCCH comprising the deferred SPS PUCCH HARQ-ACK feedback multiplexed with the PUCCH HARQ for the next scheduled PUCCH. The UE may transmit PUCCH comprising the deferred SPS PUCCH HARQ-ACK feedback multiplexed with the PUCCH HARQ for the next scheduled PUCCH in instances where the next scheduled PUCCH includes HARQ and CSI resources for transmitting HARQ and CSI. The UE may transmit the deferred SPS PUCCH HARQ-ACK feedback in the CSI resources or multiplexed with the PUCCH HARQ for the next scheduled PUCCH based on the deferred feedback configuration.

FIG. 10 is a flowchart 1000 of a method of wireless communication. The method may be performed by a UE or a component of a UE (e.g., the UE 104; the apparatus 1302). One or more of the illustrated operations may be omitted, transposed, or contemporaneous. The method may allow a UE to defer transmission of HARQ-ACK feedback that overlaps with a DL symbol based on a deferred feedback configuration.

At 1002, the UE may determine to transmit PUCCH SPS HARQ-ACK feedback. For example, 1002 may be performed by determination component 1340 of apparatus 1302. The UE may determine to transmit PUCCH SPS HARQ-ACK feedback in response to a received semi-persistently scheduled PDSCH.

At 1004, the UE may determine that the transmission of the SPS PUCCH HARQ-ACK feedback may overlap with a DL symbol. For example, 1004 may be performed by overlap component 1342 of apparatus 1302. The transmission of the SPS PUCCH HARQ-ACK feedback may be deferred to another UL symbol if the transmission of the SPS PUCCH HARQ-ACK feedback overlaps with the DL symbol. In some aspects, the transmission of the SPS PUCCH HARQ-ACK feedback may overlap with the DL symbol due, in part, to a change of the slot format. The change of the slot format may be based on a pattern or scheduled slot format change. For example, the PDSCH may be received by the UE operating in a first slot format (e.g., Slot Format 42) and having a feedback offset (e.g., K1) that is compatible with the first slot format such that the feedback is scheduled to be transmitted by the UE in an UL slot. However, in some instances, the PDSCH may be received by the UE while operating in a second slot format (e.g., Slot Format 33), such that the feedback offset (K1) is not compatible with the second slot format. As such, the feedback may be scheduled to be transmitted in an DL slot in the second slot format, which would result in a collision with a downlink transmission from the base station. In such instances, the UE may defer transmission of the SPS PUCCH HARQ-ACK feedback to another UL symbol, based on the determination that transmission of the SPS PUCCH HARQ-ACK feedback overlaps with a DL symbol.

At 1006, the UE may transmit a deferred SPS PUCCH HARQ-ACK feedback. For example, 1006 may be performed by deferred feedback component 1344 of apparatus 1302. The UE may transmit the deferred SPS PUCCH HARQ-ACK feedback based on the determination that the SPS PUCCH HARQ-ACK feedback overlaps with the DL symbol. The UE may transmit a deferred SPS PUCCH HARQ-ACK feedback in one of a next set of available UL symbols or concurrently with a PUCCH HARQ-ACK feedback transmission in a next dynamically scheduled PUCCH after the DL symbol. The UE may transmit the deferred SPS PUCCH HARQ-ACK feedback based on a deferred feedback configuration configured to define PUCCH content.

At 1008, the UE may transmit the deferred SPS PUCCH HARQ-ACK feedback in the next set of available UL symbols. For example, 1008 may be performed by deferred feedback component 1344 of apparatus 1302. The UE may transmit the deferred SPS PUCCH HARQ-ACK feedback, based on the deferred feedback configuration. The deferred feedback configuration may configure the UE to define PUCCH content and transmit the deferred SPS PUCCH HARQ-ACK feedback in the next set of available UL symbols. In some aspects, the next set of available UL symbols may comprise one or more symbols. In some aspects, the deferred SPS PUCCH HARQ-ACK feedback may be transmitted in at least a first available UL symbol of the next set of available UL symbols with a same PUCCH format of the deferred SPS PUCCH HARQ-ACK feedback and having similar PRBs and a similar beam ID.

At 1010, the UE may transmit the deferred SPS PUCCH HARQ-ACK feedback concurrently with a PUCCH HARQ-ACK feedback transmission. For example, 1010 may be performed by deferred feedback component 1344 of apparatus 1302. The UE may transmit the deferred SPS PUCCH HARQ-ACK feedback concurrently with a PUCCH HARQ-ACK feedback transmission in the next scheduled PUCCH after the DL symbol. The deferred feedback configuration may configure the UE to define PUCCH content and transmit the deferred SPS PUCCH HARQ-ACK feedback concurrently with the PUCCH HARQ-ACK feedback transmission in the next scheduled PUCCH after the DL symbol.

At 1018, if the transmission of the deferred SPS PUCCH HARQ-ACK feedback overlaps with the next scheduled PUCCH, the UE may determine that the next scheduled PUCCH only includes resources for a PUCCH HARQ-ACK feedback for the next scheduled PUCCH. For example, 1018 may be performed by determination component 1340 of apparatus 1302. The UE may determine the resource of the next scheduled PUCCH based on the deferred feedback configuration.

At 1020, the UE may determine whether the deferred SPS PUCCH HARQ-ACK feedback may be multiplexed with the PUCCH HARQ-ACK feedback for the next scheduled PUCCH. For example, 1020 may be performed by multiplex component 1346 of apparatus 1302. The UE may determine that the deferred SPS PUCCH HARQ-ACK feedback may be multiplexed with the PUCCH HARQ-ACK feedback for the next scheduled PUCCH based on whether the combination the deferred SPS PUCCH HARQ-ACK feedback and the PUCCH HARQ-ACK feedback for the next scheduled PUCCH fit within the existing PUCCH resources. The UE may determine that the deferred SPS PUCCH HARQ-ACK feedback may be multiplexed with the PUCCH HARQ-ACK feedback for the next scheduled PUCCH based on the deferred feedback configuration.

At 1022, the UE may transmit concurrently the multiplexed SPS PUCCH HARQ-ACK feedback and the PUCCH HARQ-ACK feedback in the scheduled PUCCH resource. For example, 1022 may be performed by multiplex component 1343 of apparatus 1302. The UE may transmit concurrently the multiplexed SPS PUCCH HARQ-ACK feedback and the PUCCH HARQ-ACK feedback in the scheduled PUCCH resource in instances when both the SPS PUCCH HARQ-ACK feedback and the PUCCH HARQ-ACK feedback may be multiplexed into the same scheduled PUCCH resource.

Figure 11:
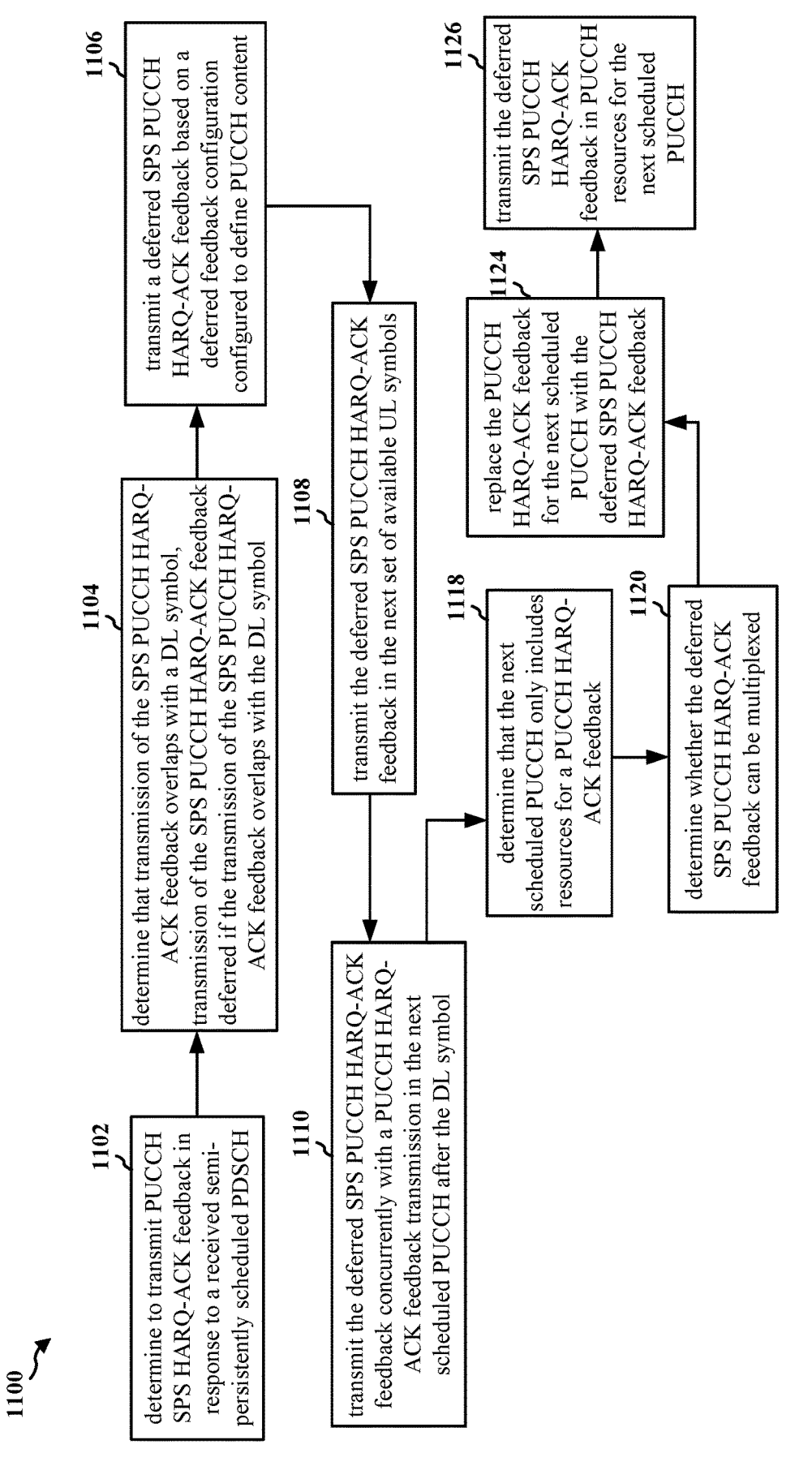
FIG. 11 is a flowchart of a method of wireless communication.

FIG. 11 is a flowchart 1100 of a method of wireless communication. The method may be performed by a UE or a component of a UE (e.g., the UE 104; the apparatus 1302). One or more of the illustrated operations may be omitted, transposed, or contemporaneous. The method may allow a UE to defer transmission of HARQ-ACK feedback that overlaps with a DL symbol based on a deferred feedback configuration.

At 1102, the UE may determine to transmit PUCCH SPS HARQ-ACK feedback. For example, 1102 may be performed by determination component 1340 of apparatus 1302. The UE may determine to transmit PUCCH SPS HARQ-ACK feedback in response to a received semi-persistently scheduled PDSCH.

At 1104, the UE may determine that the transmission of the SPS PUCCH HARQ-ACK feedback may overlap with a DL symbol. For example, 1104 may be performed by overlap component 1342 of apparatus 1302. The transmission of the SPS PUCCH HARQ-ACK feedback may be deferred to another UL symbol if the transmission of the SPS PUCCH HARQ-ACK feedback overlaps with the DL symbol. In some aspects, the transmission of the SPS PUCCH HARQ-ACK feedback may overlap with the DL symbol due, in part, to a change of the slot format. The change of the slot format may be based on a pattern or scheduled slot format change. For example, the PDSCH may be received by the UE operating in a first slot format (e.g., Slot Format 42) and having a feedback offset (e.g., K1) that is compatible with the first slot format such that the feedback is scheduled to be transmitted by the UE in an UL slot. However, in some instances, the PDSCH may be received by the UE while operating in a second slot format (e.g., Slot Format 33), such that the feedback offset (K1) is not compatible with the second slot format. As such, the feedback may be scheduled to be transmitted in an DL slot in the second slot format, which would result in a collision with a downlink transmission from the base station. In such instances, the UE may defer transmission of the SPS PUCCH HARQ-ACK feedback to another UL symbol, based on the determination that transmission of the SPS PUCCH HARQ-ACK feedback overlaps with a DL symbol.

At 1106, the UE may transmit a deferred SPS PUCCH HARQ-ACK feedback. For example, 1106 may be performed by deferred feedback component 1344 of apparatus 1302. The UE may transmit the deferred SPS PUCCH HARQ-ACK feedback based on the determination that the SPS PUCCH HARQ-ACK feedback overlaps with the DL symbol. The UE may transmit a deferred SPS PUCCH HARQ-ACK feedback in one of a next set of available UL symbols or concurrently with a PUCCH HARQ-ACK feedback transmission in a next dynamically scheduled PUCCH after the DL symbol. The UE may transmit the deferred SPS PUCCH HARQ-ACK feedback based on a deferred feedback configuration configured to define PUCCH content.

At 1108, the UE may transmit the deferred SPS PUCCH HARQ-ACK feedback in the next set of available UL symbols. For example, 1108 may be performed by deferred feedback component 1344 of apparatus 1302. The UE may transmit the deferred SPS PUCCH HARQ-ACK feedback, based on the deferred feedback configuration. The deferred feedback configuration may configure the UE to define PUCCH content and transmit the deferred SPS PUCCH HARQ-ACK feedback in the next set of available UL symbols. In some aspects, the next set of available UL symbols may comprise one or more symbols. In some aspects, the deferred SPS PUCCH HARQ-ACK feedback may be transmitted in at least a first available UL symbol of the next set of available UL symbols with a same PUCCH format of the deferred SPS PUCCH HARQ-ACK feedback and having similar PRBs and a similar beam ID.

At 1110, the UE may transmit the deferred SPS PUCCH HARQ-ACK feedback concurrently with a PUCCH HARQ-ACK feedback transmission. For example, 1110 may be performed by deferred feedback component 1344 of apparatus 1302. The UE may transmit the deferred SPS PUCCH HARQ-ACK feedback concurrently with a PUCCH HARQ-ACK feedback transmission in the next scheduled PUCCH after the DL symbol. The deferred feedback configuration may configure the UE to define PUCCH content and transmit the deferred SPS PUCCH HARQ-ACK feedback concurrently with the PUCCH HARQ-ACK feedback transmission in the next scheduled PUCCH after the DL symbol.

At 1118, if the transmission of the deferred SPS PUCCH HARQ-ACK feedback overlaps with the next scheduled PUCCH, the UE may determine that the next scheduled PUCCH only includes resources for a PUCCH HARQ-ACK feedback for the next scheduled PUCCH. For example, 1118 may be performed by determination component 1340 of apparatus 1302. The UE may determine the resource of the next scheduled PUCCH based on the deferred feedback configuration.

At 1120, the UE may determine whether the deferred SPS PUCCH HARQ-ACK feedback may be multiplexed with the PUCCH HARQ-ACK feedback for the next scheduled PUCCH. For example, 1120 may be performed by multiplex component 1346 of apparatus 1302. The UE may determine that the deferred SPS PUCCH HARQ-ACK feedback may be multiplexed with the PUCCH HARQ-ACK feedback for the next scheduled PUCCH based on whether the combination the deferred SPS PUCCH HARQ-ACK feedback and the PUCCH HARQ-ACK feedback for the next scheduled PUCCH fit within the existing PUCCH resources. The UE may determine that the deferred SPS PUCCH HARQ-ACK feedback may be multiplexed with the PUCCH HARQ-ACK feedback for the next scheduled PUCCH based on the deferred feedback configuration.

At 1124, the UE may replace the PUCCH HARQ-ACK feedback for the next scheduled PUCCH with the deferred SPS PUCCH HARQ-ACK feedback. For example, 1124 may be performed by deferred feedback component 1344 of apparatus 1302. The UE may replace the PUCCH HARQ-ACK feedback for the next scheduled PUCCH with the deferred SPS PUCCH HARQ-ACK feedback when the deferred SPS PUCCH HARQ-ACK feedback cannot be multiplexed with the PUCCH HARQ-ACK feedback for the next scheduled PUCCH. In some aspects, the deferred SPS PUCCH HARQ-ACK feedback cannot be multiplexed with the PUCCH HARQ-ACK feedback for the next scheduled PUCCH due to the combination of feedbacks not being compatible or fitting within the existing PUCCH resource. The UE may replace the PUCCH HARQ-ACK feedback for the next scheduled PUCCH with the deferred SPS PUCCH HARQ-ACK feedback based on the deferred feedback configuration.

At 1126, the UE may transmit the deferred SPS PUCCH HARQ-ACK feedback in PUCCH resources for the next scheduled PUCCH. For example, 1126 may be performed by deferred feedback component 1344 of apparatus 1302. In such aspects, the PUCCH HARQ-ACK feedback for the next scheduled PUCCH is dropped due to PUCCH HARQ-ACK feedback for the next scheduled PUCCH being replaced with the deferred SPS PUCCH HARQ-ACK feedback. The UE may transmit the deferred SPS PUCCH HARQ-ACK feedback in PUCCH resources for the next scheduled PUCCH based on the deferred feedback configuration.

Figure 12:
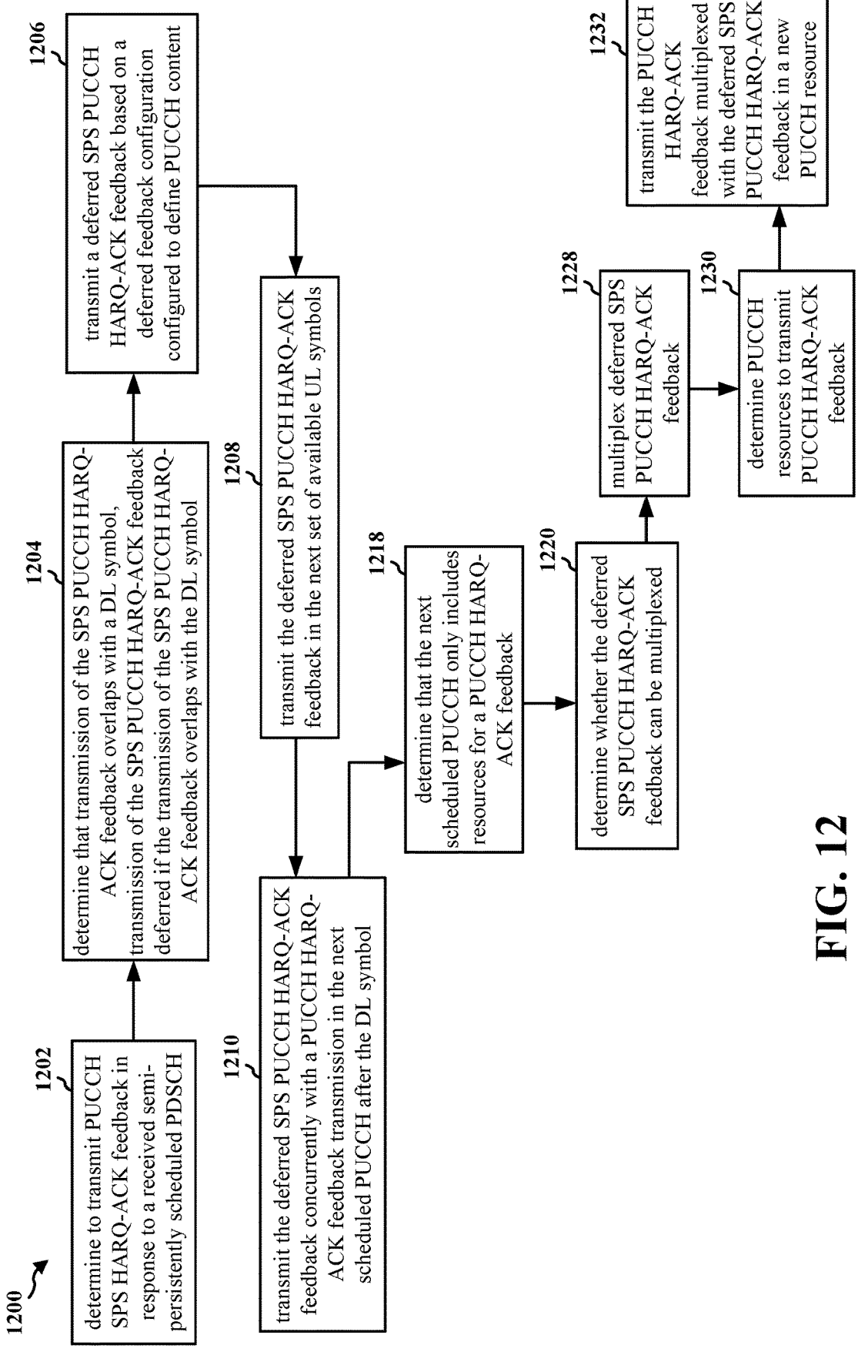
FIG. 12 is a flowchart of a method of wireless communication.

FIG. 12 is a flowchart 1200 of a method of wireless communication. The method may be performed by a UE or a component of a UE (e.g., the UE 104; the apparatus 1302). One or more of the illustrated operations may be omitted, transposed, or contemporaneous. The method may allow a UE to defer transmission of HARQ-ACK feedback that overlaps with a DL symbol based on a deferred feedback configuration.

At 1202, the UE may determine to transmit PUCCH SPS HARQ-ACK feedback. For example, 1202 may be performed by determination component 1340 of apparatus 1302. The UE may determine to transmit PUCCH SPS HARQ-ACK feedback in response to a received semi-persistently scheduled PDSCH.

At 1204, the UE may determine that the transmission of the SPS PUCCH HARQ-ACK feedback may overlap with a DL symbol. For example, 1204 may be performed by overlap component 1342 of apparatus 1302. The transmission of the SPS PUCCH HARQ-ACK feedback may be deferred to another UL symbol if the transmission of the SPS PUCCH HARQ-ACK feedback overlaps with the DL symbol. In some aspects, the transmission of the SPS PUCCH HARQ-ACK feedback may overlap with the DL symbol due, in part, to a change of the slot format. The change of the slot format may be based on a pattern or scheduled slot format change. For example, the PDSCH may be received by the UE operating in a first slot format (e.g., Slot Format 42) and having a feedback offset (e.g., K1) that is compatible with the first slot format such that the feedback is scheduled to be transmitted by the UE in an UL slot. However, in some instances, the PDSCH may be received by the UE while operating in a second slot format (e.g., Slot Format 33), such that the feedback offset (K1) is not compatible with the second slot format. As such, the feedback may be scheduled to be transmitted in an DL slot in the second slot format, which would result in a collision with a downlink transmission from the base station. In such instances, the UE may defer transmission of the SPS PUCCH HARQ-ACK feedback to another UL symbol, based on the determination that transmission of the SPS PUCCH HARQ-ACK feedback overlaps with a DL symbol.

At 1206, the UE may transmit a deferred SPS PUCCH HARQ-ACK feedback. For example, 1206 may be performed by deferred feedback component 1344 of apparatus 1302. The UE may transmit the deferred SPS PUCCH HARQ-ACK feedback based on the determination that the SPS PUCCH HARQ-ACK feedback overlaps with the DL symbol. The UE may transmit a deferred SPS PUCCH HARQ-ACK feedback in one of a next set of available UL symbols or concurrently with a PUCCH HARQ-ACK feedback transmission in a next dynamically scheduled PUCCH after the DL symbol. The UE may transmit the deferred SPS PUCCH HARQ-ACK feedback based on a deferred feedback configuration configured to define PUCCH content.

At 1208, the UE may transmit the deferred SPS PUCCH HARQ-ACK feedback in the next set of available UL symbols. For example, 1208 may be performed by deferred feedback component 1344 of apparatus 1302. The UE may transmit the deferred SPS PUCCH HARQ-ACK feedback, based on the deferred feedback configuration. The deferred feedback configuration may configure the UE to define PUCCH content and transmit the deferred SPS PUCCH HARQ-ACK feedback in the next set of available UL symbols. In some aspects, the next set of available UL symbols may comprise one or more symbols. In some aspects, the deferred SPS PUCCH HARQ-ACK feedback may be transmitted in at least a first available UL symbol of the next set of available UL symbols with a same PUCCH format of the deferred SPS PUCCH HARQ-ACK feedback and having similar PRBs and a similar beam ID.

At 1210, the UE may transmit the deferred SPS PUCCH HARQ-ACK feedback concurrently with a PUCCH HARQ-ACK feedback transmission. For example, 1210 may be performed by deferred feedback component 1344 of apparatus 1302. The UE may transmit the deferred SPS PUCCH HARQ-ACK feedback concurrently with a PUCCH HARQ-ACK feedback transmission in the next scheduled PUCCH after the DL symbol. The deferred feedback configuration may configure the UE to define PUCCH content and transmit the deferred SPS PUCCH HARQ-ACK feedback concurrently with the PUCCH HARQ-ACK feedback transmission in the next scheduled PUCCH after the DL symbol.

At 1218, if the transmission of the deferred SPS PUCCH HARQ-ACK feedback overlaps with the next scheduled PUCCH, the UE may determine that the next scheduled PUCCH only includes resources for a PUCCH HARQ-ACK feedback for the next scheduled PUCCH. For example, 1218 may be performed by determination component 1340 of apparatus 1302. The UE may determine the resource of the next scheduled PUCCH based on the deferred feedback configuration.

At 1220, the UE may determine whether the deferred SPS PUCCH HARQ-ACK feedback may be multiplexed with the PUCCH HARQ-ACK feedback for the next scheduled PUCCH. For example, 1220 may be performed by multiplex component 1346 of apparatus 1302. The UE may determine that the deferred SPS PUCCH HARQ-ACK feedback may be multiplexed with the PUCCH HARQ-ACK feedback for the next scheduled PUCCH based on whether the combination the deferred SPS PUCCH HARQ-ACK feedback and the PUCCH HARQ-ACK feedback for the next scheduled PUCCH fit within the existing PUCCH resources. The UE may determine that the deferred SPS PUCCH HARQ-ACK feedback may be multiplexed with the PUCCH HARQ-ACK feedback for the next scheduled PUCCH based on the deferred feedback configuration.

At 1228, the UE may multiplex the PUCCH HARQ-ACK feedback for the next scheduled PUCCH and the deferred SPS PUCCH HARQ-ACK feedback. For example, 1228 may be performed by multiplex component 1346 of apparatus 1302. The may multiplex the PUCCH HARQ-ACK feedback for the next scheduled PUCCH and the deferred SPS PUCCH HARQ-ACK feedback upon the determination that the deferred SPS PUCCH HARQ-ACK feedback may be multiplexed with the PUCCH HARQ-ACK feedback for the next scheduled PUCCH. The UE may multiplex the PUCCH HARQ-ACK feedback for the next scheduled PUCCH and the deferred SPS PUCCH HARQ-ACK feedback based on the deferred feedback configuration.

At 1230, the UE may determine an amount of PUCCH resources. For example, 1230 may be performed by determination component 1340 of apparatus 1302. The UE may determine an amount of PUCCH resources needed to transmit the PUCCH HARQ-ACK feedback for the next scheduled PUCCH multiplexed with the deferred SPS PUCCH HARQ-ACK feedback. The UE may determine the amount of PUCCH resources needed to transmit the PUCCH HARQ-ACK feedback for the next scheduled PUCCH multiplexed with the deferred SPS PUCCH HARQ-ACK feedback in response to multiplexing the PUCCH HARQ-ACK feedback for the next scheduled PUCCH and the deferred SPS PUCCH HARQ-ACK feedback. The UE may determine the amount of PUCCH resources needed based on the deferred feedback configuration.

At 1232, the UE may transmit the PUCCH HARQ-ACK feedback for the next scheduled PUCCH multiplexed with the deferred SPS PUCCH HARQ-ACK feedback in a new PUCCH resource. For example, 1232 may be performed by multiplex component 1346 of apparatus 1302. The UE may transmit the PUCCH HARQ-ACK feedback for the next scheduled PUCCH multiplexed with the deferred SPS PUCCH HARQ-ACK feedback in the new PUCCH resource based on a PRI.

The UE may utilize the new PUCCH resource to transmit the PUCCH HARQ-ACK feedback for the next scheduled PUCCH multiplexed with the deferred SPS PUCCH HARQ-ACK feedback in instances when both the SPS PUCCH HARQ-ACK feedback and the PUCCH HARQ-ACK feedback cannot be multiplexed into the same scheduled PUCCH resource. In some aspects, the PRI comprises resources for a plurality of different payloads, wherein the PM may support transmission of the PUCCH HARQ-ACK feedback for the next scheduled PUCCH multiplexed with the deferred SPS PUCCH HARQ-ACK feedback. For example, the PRI may include the new PUCCH resource which may comprise resources for different payloads such that the PUCCH HARQ-ACK feedback for the next scheduled PUCCH multiplexed with the deferred SPS PUCCH HARQ-ACK feedback may be transmitted.

Figure 13:
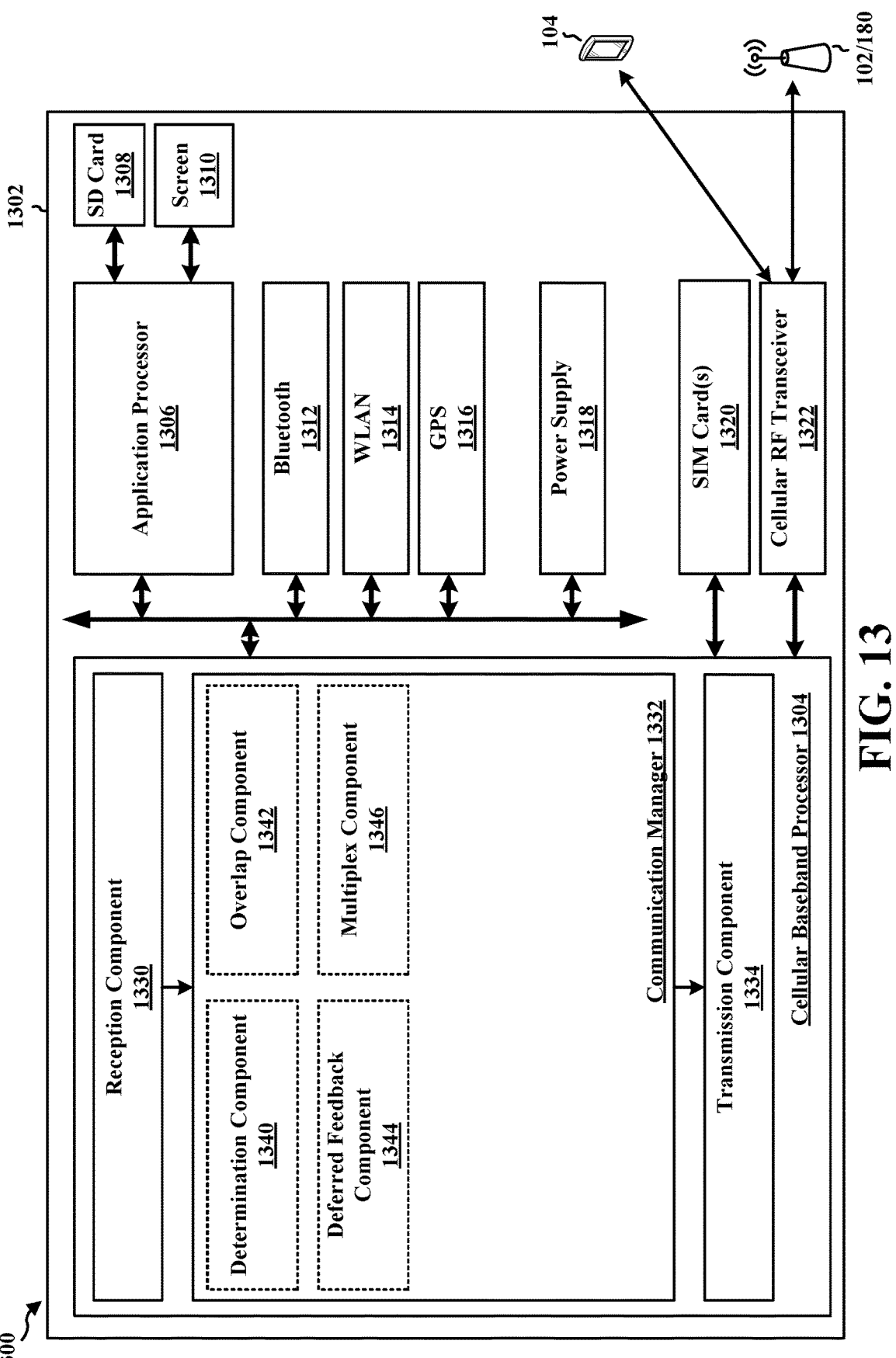
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302. The communication manager 1332 includes a determination component 1340 that is configured to determine to transmit PUCCH SPS HARQ-ACK feedback, e.g., as described in connection with 802 of FIG. 8, 902 of FIG. 9, 1002 of FIG. 10, 1102 of FIG. 11, or 1202 of FIG. 12. The determination component 1340 may be configured to determine that the next scheduled PUCCH includes CSI or HARQ resources, e.g., as described in connection with 912 of FIG. 9. The determination component 1340 may be configured to determine that the next scheduled PUCCH only includes resources for a PUCCH HARQ-ACK feedback for the next scheduled PUCCH, e.g., as described in connection with 1018 of FIG. 10, 1118 of FIG. 11, or 1218 of FIG. 12. The determination component 1340 may be configured to determine an amount of PUCCH resources, e.g., as described in connection with 1230 of FIG. 12. The communication manager 1332 further includes an overlap component 1342 that is configured to determine that the transmission of the SPS PUCCH HARQ-ACK feedback may overlap with a DL symbol, e.g., as described in connection with 804 of FIG. 8, 904 of FIG. 9, 1004 of FIG. 10, 1104 of FIG. 11, or 1204 of FIG. 12. The communication manager 1332 further includes a deferred feedback component 1344 that is configured to transmit a deferred SPS PUCCH HARQ-ACK feedback, e.g., as described in connection with 806 of FIG. 8, 906 of FIG. 9, 1006 of FIG. 10, 1106 of FIG. 11, or 1206 of FIG. 12. The deferred feedback component 1344 may be configured to transmit the deferred SPS PUCCH HARQ-ACK feedback in the next set of available UL symbols, e.g., as described in connection with 908 of FIG. 9, 1008 of FIG. 10, 1108 of FIG. 11, or 1208 of FIG. 12. The deferred feedback component 1344 may be configured to transmit the deferred SPS PUCCH HARQ-ACK feedback concurrently with a PUCCH HARQ-ACK feedback transmission, e.g., as described in connection with 910 of FIG. 9, 1010 of FIG. 10, 1110 of FIG. 11, or 1210 of FIG. 12. The deferred feedback component 1344 may be configured to replace the CSI with the deferred SPS PUCCH HARQ-ACK feedback, e.g., as described in connection with 914 of FIG. 9. The deferred feedback component 1344 may be configured to transmit the deferred SPS PUCCH HARQ-ACK feedback e.g., as described in connection with 916 of FIG. 9. The deferred feedback component 1344 may be configured to replace the PUCCH HARQ-ACK feedback for the next scheduled PUCCH with the deferred SPS PUCCH HARQ-ACK feedback, e.g., as described in connection with 1124 of FIG. 11. The deferred feedback component 1344 may be configured to transmit the deferred SPS PUCCH HARQ-ACK feedback in PUCCH resources for the next scheduled PUCCH, e.g., as described in connection with 1126 of FIG. 11. The communication manager 1332 further includes a multiplex component 1346 that is configured to determine whether the deferred SPS PUCCH HARQ-ACK feedback may be multiplexed with the PUCCH HARQ-ACK feedback for the next scheduled PUCCH, e.g., as described in connection with 1020 of FIG. 10, 1120 of FIG. 11, or 1220 of FIG. 12. The multiplex component 1346 may be configured to transmit concurrently the multiplexed SPS PUCCH HARQ-ACK feedback and the PUCCH HARQ-ACK feedback in the scheduled PUCCH resource, e.g., as described in connection with 1022 of FIG. 10. The multiplex component 1346 may be configured to multiplex the PUCCH HARQ-ACK feedback for the next scheduled PUCCH and the deferred SPS PUCCH HARQ-ACK feedback, e.g., as described in connection with 1228 of FIG. 12. The multiplex component 1346 may be configured to transmit the PUCCH HARQ-ACK feedback for the next scheduled PUCCH multiplexed with the deferred SPS PUCCH HARQ-ACK feedback in a new PUCCH resource, e.g., as described in connection with 1232 of FIG. 12.

The apparatus may include additional components that perform each of the blocks of the algorithm in the flowcharts of FIGS. 8-12. As such, each block in the flowcharts of FIGS. 8-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for determining to transmit PUCCH SPS HARQ-ACK feedback in response to a received semi-persistently scheduled PDSCH. The apparatus includes means for determining that the transmission of the SPS PUCCH HARQ-ACK feedback would overlap with a DL symbol. The transmission of the SPS PUCCH HARQ-ACK feedback is deferred to another UL symbol if the transmission of the SPS PUCCH HARQ-ACK feedback overlaps with the DL symbol. The apparatus includes means for transmitting, based on the determination that the SPS PUCCH HARQ-ACK feedback would overlap with a DL symbol, a deferred SPS PUCCH HARQ-ACK feedback in one of a next set of available UL symbols or concurrently with a PUCCH HARQ-ACK feedback transmission in a next dynamically scheduled PUCCH after the DL symbol based on a deferred feedback configuration configured to define PUCCH content. The apparatus further includes means for transmitting the deferred SPS PUCCH HARQ-ACK feedback in the next set of available UL symbols. The apparatus further includes means for transmitting the deferred SPS PUCCH HARQ-ACK feedback concurrently with a PUCCH HARQ-ACK feedback transmission in the next scheduled PUCCH after the DL symbol. The apparatus further includes means for determining that the next scheduled PUCCH includes CSI resources for transmitting CSI. The apparatus further includes means for replacing the CSI with the deferred SPS PUCCH HARQ-ACK feedback. The apparatus further includes means for transmitting the deferred SPS PUCCH HARQ-ACK feedback in the CSI resources concurrently with the PUCCH HARQ-ACK feedback in the scheduled PUCCH. The apparatus further includes means for determining that the next scheduled PUCCH includes HARQ and CSI resources for transmitting HARQ and CSI. The apparatus further includes means for replacing the CSI with the deferred SPS PUCCH HARQ-ACK feedback, wherein the CSI is dropped. The apparatus further includes means for transmitting PUCCH comprising the deferred SPS PUCCH HARQ-ACK feedback multiplexed with the PUCCH HARQ for the next scheduled PUCCH. The apparatus further includes means for determining that the next scheduled PUCCH only includes resources for a PUCCH HARQ-ACK feedback for the next scheduled PUCCH. The apparatus further includes means for determining whether the deferred SPS PUCCH HARQ-ACK feedback can be multiplexed with the PUCCH HARQ-ACK feedback for the next scheduled PUCCH. The apparatus further includes means for transmitting concurrently the multiplexed SPS PUCCH HARQ-ACK feedback and PUCCH HARQ-ACK feedback in the scheduled PUCCH resource when both the SPS PUCCH HARQ-ACK feedback and the PUCCH HARQ-ACK feedback can be multiplexed into the same scheduled PUCCH resource. The apparatus further includes means for replacing the PUCCH HARQ-ACK feedback for the next scheduled PUCCH with the deferred SPS PUCCH HARQ-ACK feedback when the deferred SPS PUCCH HARQ-ACK feedback cannot be multiplexed with the PUCCH HARQ-ACK feedback for the next scheduled PUCCH. The apparatus further includes means for transmitting the deferred SPS PUCCH HARQ-ACK feedback in PUCCH resources for the next scheduled PUCCH, wherein the PUCCH HARQ-ACK feedback for the next scheduled PUCCH is dropped. The apparatus further includes means for multiplexing the PUCCH HARQ-ACK feedback for the next scheduled PUCCH and the deferred SPS PUCCH HARQ-ACK feedback. The apparatus further includes means for determining an amount of PUCCH resources needed to transmit the PUCCH HARQ-ACK feedback for the next scheduled PUCCH multiplexed with the deferred SPS PUCCH HARQ-ACK feedback. The apparatus further includes means for transmitting the PUCCH HARQ-ACK feedback for the next scheduled PUCCH multiplexed with the deferred SPS PUCCH HARQ-ACK feedback in a new PUCCH resource, based on a PRI, when both the SPS PUCCH HARQ-ACK feedback and the PUCCH HARQ-ACK feedback cannot be multiplexed into the same scheduled PUCCH resource. The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

FIG. 14 is a flowchart 1400 of a method of wireless communication. The method may be performed by a base station (e.g., the base station 102/180; the apparatus 1602). One or more of the illustrated operations may be omitted, transposed, or contemporaneous. The method may allow a base station to configure a UE to defer transmission of HARQ-ACK feedback that overlaps with a DL symbol based on a deferred feedback configuration.

At 1402, the base station may provide a deferred feedback configuration to define PUCCH content. For example, 1402 may be performed by configuration component 1640 of apparatus 1602. The base station may provide the deferred feedback configuration to a UE. The deferred feedback configuration may configure the UE to defer transmission of PUCCH SPS HARQ-ACK feedback in response to a semi-persistently scheduled PDSCH. The transmission of the PUCCH SPS HARQ-ACK feedback may be deferred, based on the deferred feedback configuration, if the transmission the PUCCH SPS HARQ-ACK feedback collides with a DL symbol or a subsequent PUCCH HARQ-ACK feedback transmission in a next dynamically scheduled PUCCH after the DL symbol.

At 1404, the base station may transmit the semi-persistently scheduled PDSCH. For example, 1404 may be performed by PDSCH component 1642 of apparatus 1602. The base station may transmit the semi-persistently scheduled PDSCH to the UE. The transmission of the semi-persistently scheduled PDSCH may be based on the deferred feedback configuration.

At 1406, the base station may monitor for the deferred transmission of the PUCCH SPS HARQ-ACK feedback. For example, 1406 may be performed by monitor component 1646 of apparatus 1602. The base station may monitor for the deferred transmission of the PUCCH SPS HARQ-ACK feedback based on the deferred feedback configuration.

Figure 15:
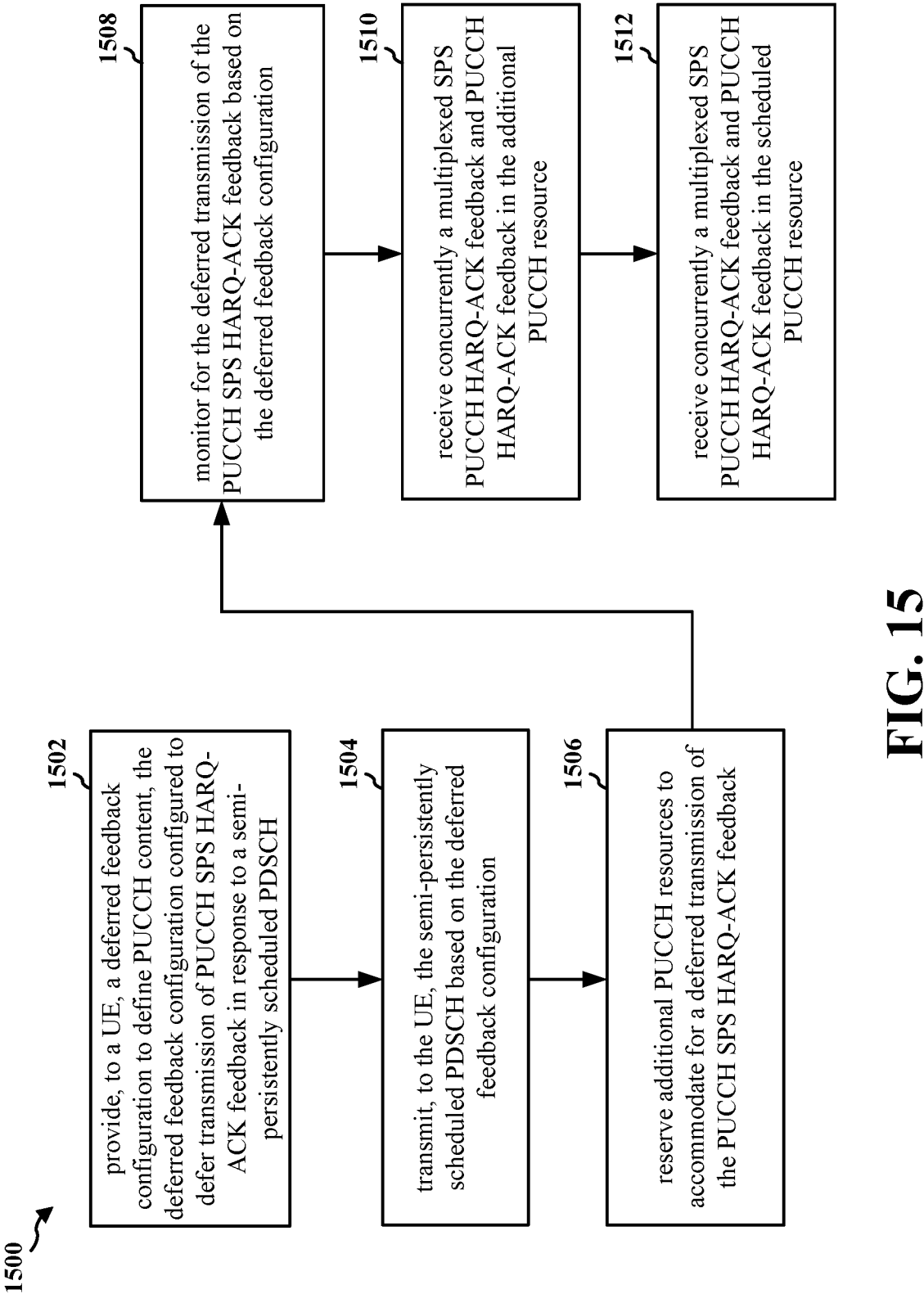
FIG. 15 is a flowchart of a method of wireless communication.

FIG. 15 is a flowchart 1500 of a method of wireless communication. The method may be performed by a base station (e.g., the base station 102/180; the apparatus 1602). One or more of the illustrated operations may be omitted, transposed, or contemporaneous. The method may allow a base station to configure a UE to defer transmission of HARQ-ACK feedback that overlaps with a DL symbol based on a deferred feedback configuration.

At 1502, the base station may provide a deferred feedback configuration to define PUCCH content. For example, 1502 may be performed by configuration component 1640 of apparatus 1602. The base station may provide the deferred feedback configuration to a UE. The deferred feedback configuration may configure the UE to defer transmission of PUCCH SPS HARQ-ACK feedback in response to a semi-persistently scheduled PDSCH. The transmission of the PUCCH SPS HARQ-ACK feedback may be deferred, based on the deferred feedback configuration, if the transmission the PUCCH SPS HARQ-ACK feedback collides with a DL symbol or a subsequent PUCCH HARQ-ACK feedback transmission in a next dynamically scheduled PUCCH after the DL symbol.

At 1504, the base station may transmit the semi-persistently scheduled PDSCH. For example, 1504 may be performed by PDSCH component 1642 of apparatus 1602. The base station may transmit the semi-persistently scheduled PDSCH to the UE. The transmission of the semi-persistently scheduled PDSCH may be based on the deferred feedback configuration.

At 1506, the base station may reserve additional PUCCH resources. For example, 1506 may be performed by reservation component 16144 of apparatus 1602. The base station may reserve the additional PUCCH resources to accommodate for a deferred transmission of a PUCCH SPS HARQ-ACK feedback. In some aspects, the additional PUCCH resources may allow for transmission of different payloads comprising the PUCCH SPS HARQ-ACK feedback. In some aspects, the additional PUCCH resources may allow for transmission of a PUCCH format based on a PRI.

At 1508, the base station may monitor for the deferred transmission of the PUCCH SPS HARQ-ACK feedback. For example, 1508 may be performed by monitor component 1146 of apparatus 1102. The base station may monitor for the deferred transmission of the PUCCH SPS HARQ-ACK feedback based on the deferred feedback configuration.

At 1510, the base station may receive concurrently a multiplexed SPS PUCCH HARQ-ACK feedback and PUCCH HARQ-ACK feedback. For example, 1510 may be performed by feedback component 1648 of apparatus 1602. The base station may receive the multiplexed SPS PUCCH HARQ-ACK feedback and PUCCH HARQ-ACK feedback in the additional PUCCH resources. The additional PUCCH resources being reserved to accommodate the deferred transmission of the PUCCH SPS HARQ-ACK feedback.

At 1512, the base station may receive concurrently a multiplex SPS PUCCH HARQ-ACK feedback and PUCCH HARQ-ACK feedback. For example, 1512 may be performed by feedback component 1648 of apparatus 1602. The base station may receive concurrently the multiplex SPS PUCCH HARQ-ACK feedback and PUCCH HARQ-ACK feedback in the scheduled PUCCH resource.

Figure 16:
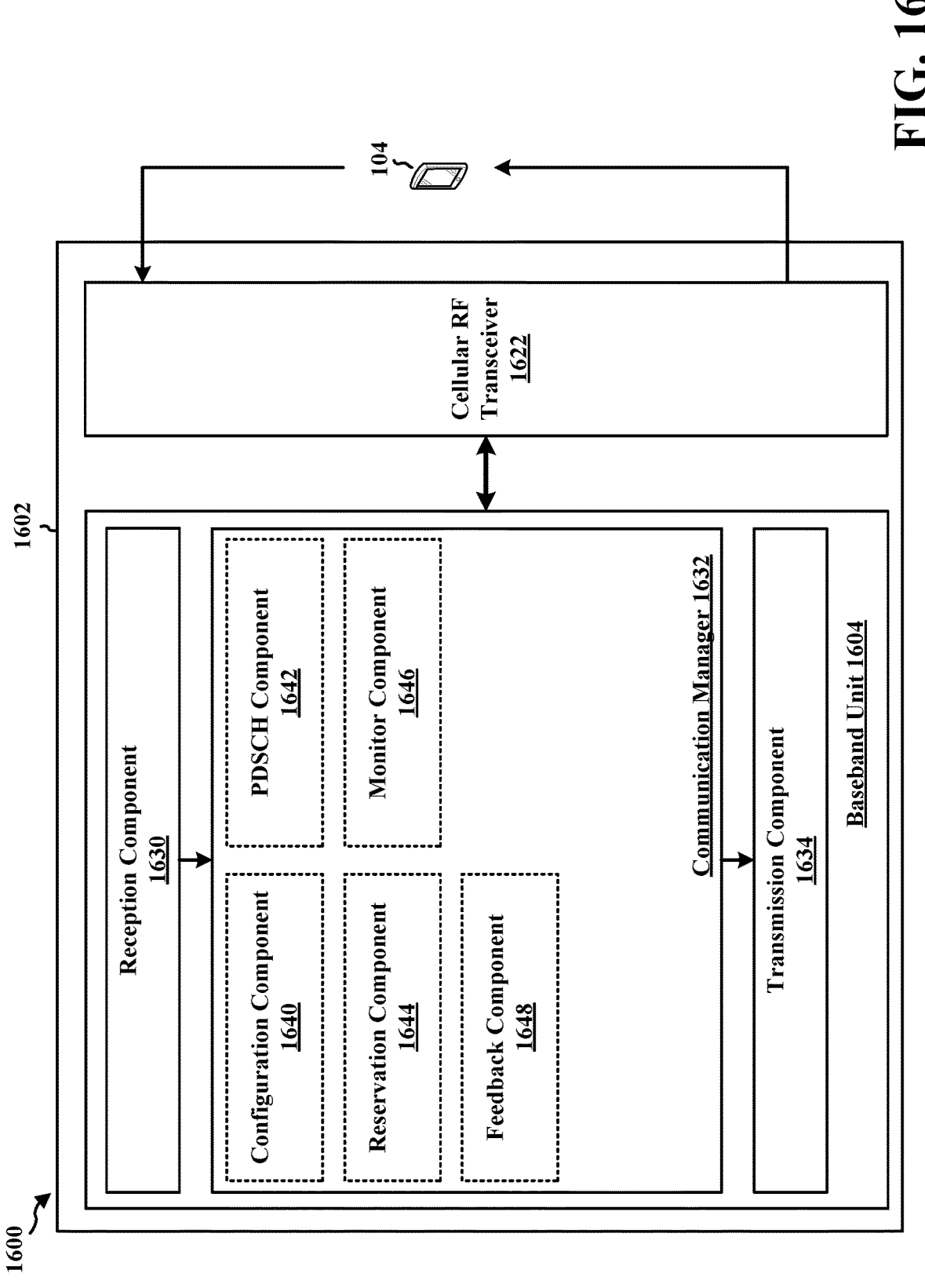
FIG. 16 is a diagram illustrating an example of a hardware implementation for an example apparatus.

FIG. 16 is a diagram 1600 illustrating an example of a hardware implementation for an apparatus 1602. The apparatus 1602 may be a base station, a component of a base station, or may implement base station functionality. In some aspects, the apparatus 1602 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes a configuration component 1640 that may provide a deferred feedback configuration to define PUCCH content, e.g., as described in connection with 1402 of FIG. 14 or 1502 of FIG. 15. The communication manager 1632 further includes a PDSCH component 1642 that may transmit the semi-persistently scheduled PDSCH, e.g., as described in connection with 1404 of FIG. 14 or 1504 of FIG. 15. The communication manager 1632 further includes a reservation component 1644 that may reserve additional PUCCH resources, e.g., as described in connection with 1506 of FIG. 15. The communication manager 1632 further includes a monitor component 1646 that may monitor for the deferred transmission of the PUCCH SPS HARQ-ACK feedback, e.g., as described in connection with 1406 of FIG. 14 or 1508 of FIG. 15. The communication manager 1632 further includes a feedback component 1648 that may receive concurrently a multiplexed SPS PUCCH HARQ-ACK feedback and PUCCH HARQ-ACK feedback, e.g., as described in connection with 1510 of FIG. 15. The feedback component 1648 may be further configured to receive concurrently a multiplex SPS PUCCH HARQ-ACK feedback and PUCCH HARQ-ACK feedback, e.g., as described in connection with 1512 of FIG. 15.

The apparatus may include additional components that perform each of the blocks of the algorithm in the flowcharts of FIGS. 14 and 15. As such, each block in the flowcharts of FIGS. 14 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for providing, to a UE, a deferred feedback configuration to define PUCCH content, the deferred feedback configuration configured to defer transmission of PUCCH SPS HARQ-ACK feedback in response to a semi-persistently scheduled PDSCH. The transmission of the PUCCH SPS HARQ-ACK feedback is deferred if the transmission collides with a DL symbol or a subsequent PUCCH HARQ-ACK feedback transmission in a next dynamically scheduled PUCCH after the DL symbol. The apparatus includes means for transmitting, to the UE, the semi-persistently scheduled PDSCH based on the deferred feedback configuration. The apparatus includes means for monitoring for a deferred transmission of the PUCCH SPS HARQ-ACK feedback based on the deferred feedback configuration. The apparatus further include means for reserving additional PUCCH resources to accommodate for the deferred transmission of the PUCCH SPS HARQ-ACK feedback. The apparatus further includes means for receiving concurrently a multiplexed SPS PUCCH HARQ-ACK feedback and PUCCH HARQ-ACK feedback in the additional PUCCH resource. The apparatus further includes means for receiving concurrently a multiplexed SPS PUCCH HARQ-ACK feedback and PUCCH HARQ-ACK feedback in the scheduled PUCCH resource. The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to determine to transmit PUCCH SPS HARQ-ACK feedback in response to a received semi-persistently scheduled PDSCH; determine that transmission of the SPS PUCCH HARQ-ACK feedback would overlap with a DL symbol, wherein the transmission of the SPS PUCCH HARQ-ACK feedback is deferred to another UL symbol if the transmission of the SPS PUCCH HARQ-ACK feedback overlaps with the DL symbol; and transmit, based on the determination that the SPS PUCCH HARQ-ACK feedback would overlap with a DL symbol, a deferred SPS PUCCH HARQ-ACK feedback in one of a next set of available UL symbols or concurrently with a PUCCH HARQ-ACK feedback transmission in a next dynamically scheduled PUCCH after the DL symbol based on a deferred feedback configuration configured to define PUCCH content.

Aspect 2 is the apparatus of aspect 1, further including a transceiver coupled to the at least one processor.

Aspect 3 is the apparatus of any of aspects 1 and 2, further includes that to define the PUCCH content the deferred feedback configuration the at least one processor is further configured to transmit the deferred SPS PUCCH HARQ-ACK feedback concurrently with a PUCCH HARQ-ACK feedback transmission in the next scheduled PUCCH after the DL symbol.

Aspect 4 is the apparatus of any of aspects 1-3, further includes that if transmission of the deferred SPS PUCCH HARQ-ACK feedback overlaps the next scheduled PUCCH, the at least one process is further configured to determine that the next scheduled PUCCH includes CSI resources for transmitting CSI; replace the CSI with the deferred SPS PUCCH HARQ-ACK feedback; and transmit the deferred SPS PUCCH HARQ-ACK feedback in the CSI resources concurrently with the PUCCH HARQ-ACK feedback in the scheduled PUCCH.

Aspect 5 is the apparatus of any of aspects 1-4, further includes that if the transmission of the deferred SPS PUCCH HARQ-ACK feedback overlaps the next scheduled PUCCH, the at least one process is further configured to determine that the next scheduled PUCCH includes HARQ and CSI resources for transmitting HARQ and CSI; replace the CSI with the deferred SPS PUCCH HARQ-ACK feedback, wherein the CSI is dropped; and transmit PUCCH comprising the deferred SPS PUCCH HARQ-ACK feedback multiplexed with the PUCCH HARQ for the next scheduled PUCCH.

Aspect 6 is the apparatus of any of aspects 1-5, further includes that if the transmission of the deferred SPS PUCCH HARQ-ACK feedback overlaps the next scheduled PUCCH, the at least one process is further configured to determine that the next scheduled PUCCH only includes resources for a PUCCH HARQ-ACK feedback for the next scheduled PUCCH; and determine whether the deferred SPS PUCCH HARQ-ACK feedback can be multiplexed with the PUCCH HARQ-ACK feedback for the next scheduled PUCCH.

Aspect 7 is the apparatus of any of aspects 1-6, further includes that the at least one process is further configured to transmit concurrently the multiplexed SPS PUCCH HARQ-ACK feedback and PUCCH HARQ-ACK feedback in the scheduled PUCCH resource when both the SPS PUCCH HARQ-ACK feedback and the PUCCH HARQ-ACK feedback can be multiplexed into the same scheduled PUCCH resource.

Aspect 8 is the apparatus of any of aspects 1-7, further includes that the at least one process is further configured to replace the PUCCH HARQ-ACK feedback for the next scheduled PUCCH with the deferred SPS PUCCH HARQ-ACK feedback when the deferred SPS PUCCH HARQ-ACK feedback cannot be multiplexed with the PUCCH HARQ-ACK feedback for the next scheduled PUCCH; and transmit the deferred SPS PUCCH HARQ-ACK feedback in PUCCH resources for the next scheduled PUCCH, wherein the PUCCH HARQ-ACK feedback for the next scheduled PUCCH is dropped.

Aspect 9 is the apparatus of any of aspects 1-8, further includes that the at least one process is further configured to multiplex the PUCCH HARQ-ACK feedback for the next scheduled PUCCH and the deferred SPS PUCCH HARQ-ACK feedback; determine an amount of PUCCH resources needed to transmit the PUCCH HARQ-ACK feedback for the next scheduled PUCCH multiplexed with the deferred SPS PUCCH HARQ-ACK feedback; and transmit the PUCCH HARQ-ACK feedback for the next scheduled PUCCH multiplexed with the deferred SPS PUCCH HARQ-ACK feedback in a new PUCCH resource, based on a PRI, when both the SPS PUCCH HARQ-ACK feedback and the PUCCH HARQ-ACK feedback cannot be multiplexed into the same scheduled PUCCH resource.

Aspect 10 is the apparatus of any of aspects 1-9, further includes that the PRI comprises resources for a plurality of different payloads, wherein the PM supports transmission of the PUCCH HARQ-ACK feedback for the next scheduled PUCCH multiplexed with the deferred SPS PUCCH HARQ-ACK feedback.

Aspect 11 is the apparatus of any of aspects 1-10, further includes that to define the PUCCH content the at least one processor is further configured to transmit the deferred SPS PUCCH HARQ-ACK feedback in the next set of available UL symbols.

Aspect 12 is the apparatus of any of aspects 1-11, further includes that the deferred SPS PUCCH HARQ-ACK feedback is transmitted in at least a first available UL symbol of the next set of available UL symbols with a same PUCCH format of the deferred SPS PUCCH HARQ-ACK feedback having similar PRBs and a similar beam ID.

Aspect 13 is a method of wireless communication for implementing any of aspects 1-12.

Aspect 14 is an apparatus for wireless communication including means for implementing any of aspects 1-12.

Aspect 15 is a computer-readable medium storing computer executable code, where the code when executed by a processor causes the processor to implement any of aspects 1-12.

Aspect 16 is an apparatus for wireless communication at a base station including at least one processor coupled to a memory and configured to provide, to a UE, a deferred feedback configuration to define PUCCH content, the deferred feedback configuration configured to defer transmission of PUCCH SPS HARQ-ACK feedback in response to a semi-persistently scheduled PDSCH, wherein transmission of the PUCCH SPS HARQ-ACK feedback is deferred if the transmission collides with a DL symbol or a subsequent PUCCH HARQ-ACK feedback transmission in a next dynamically scheduled PUCCH after the DL symbol; transmit, to the UE, the semi-persistently scheduled PDSCH based on the deferred feedback configuration; and monitor for a deferred transmission of the PUCCH SPS HARQ-ACK feedback based on the deferred feedback configuration.

Aspect 17 is the apparatus of aspect 16, further including a transceiver coupled to the at least one processor.

Aspect 18 is the apparatus of any of aspects 16 and 17, further includes that the at least one processor is further configured to reserve additional PUCCH resources to accommodate for the deferred transmission of the PUCCH SPS HARQ-ACK feedback.

Aspect 19 is the apparatus of any of aspects 16-18, further includes that the additional PUCCH resources allow for transmission of different payloads comprising the PUCCH SPS HARQ-ACK feedback or of a PUCCH format based on a PRI.

Aspect 20 is the apparatus of any of aspects 16-19, further includes that the at least one processor is further configured to receive concurrently a multiplexed SPS PUCCH HARQ-ACK feedback and PUCCH HARQ-ACK feedback in the additional PUCCH resource.

Aspect 21 is the apparatus of any of aspects 16-20, further includes that the at least one processor is further configured to receive concurrently a multiplexed SPS PUCCH HARQ-ACK feedback and PUCCH HARQ-ACK feedback in the scheduled PUCCH resource.

Aspect 22 is a method of wireless communication for implementing any of aspects 16-21.

Aspect 23 is an apparatus for wireless communication including means for implementing any of aspects 16-21.

Aspect 24 is a computer-readable medium storing computer executable code, where the code when executed by a processor causes the processor to implement any of aspects 16-21.

What is claimed is:

1. An apparatus for wireless communication at a user equipment (UE), comprising:
a memory; and
at least one processor coupled to the memory and configured to:
determine to transmit physical uplink control channel (PUCCH) semi-persistent scheduling (SPS) hybrid automatic repeat request (HARQ) acknowledgment (ACK) (HARQ-ACK) feedback in response to a received semi-persistently scheduled physical downlink shared channel (PDSCH);
determine that transmission of the SPS PUCCH HARQ-ACK feedback would overlap with a downlink (DL) symbol, wherein the transmission of the SPS PUCCH HARQ-ACK feedback is deferred to another uplink (UL) symbol if the transmission of the SPS PUCCH HARQ-ACK feedback overlaps with the DL symbol; and
transmit, based on the determination that the SPS PUCCH HARQ-ACK feedback would overlap with a DL symbol, a deferred SPS PUCCH HARQ-ACK feedback concurrently with a PUCCH HARQ-ACK feedback transmission in a next dynamically scheduled PUCCH after the DL symbol based on a deferred feedback configuration configured to define PUCCH content, wherein if transmission of the deferred SPS PUCCH HARQ-ACK feedback overlaps the next scheduled PUCCH, the at least one process is further configured to:

determine that the next scheduled PUCCH includes channel state information (CSI) resources for transmitting CSI;

replace the CSI with the deferred SPS PUCCH HARQ-ACK feedback; and transmit the deferred SPS PUCCH HARQ-ACK feedback in the CSI resources concurrently with the PUCCH HARQ-ACK feedback in the scheduled PUCCH.

2. The apparatus of claim 1, further comprising a transceiver coupled to the at least one processor.

3. An apparatus for wireless communication at a user equipment (UE), comprising:

a memory; and at least one processor coupled to the memory and configured to:

determine to transmit physical uplink control channel (PUCCH) semi-persistent scheduling (SPS) hybrid automatic repeat request (HARQ) acknowledgment (ACK) (HARQ-ACK) feedback in response to a received semi-persistently scheduled physical downlink shared channel (PDSCH);

determine that transmission of the SPS PUCCH HARQ-ACK feedback would overlap with a downlink (DL) symbol, wherein the transmission of the SPS PUCCH HARQ-ACK feedback is deferred to another uplink (UL) symbol if the transmission of the SPS PUCCH HARQ-ACK feedback overlaps with the DL symbol; and transmit, based on the determination that the SPS PUCCH HARQ-ACK feedback would overlap with a DL symbol, a deferred SPS PUCCH HARQ-ACK feedback concurrently with a PUCCH HARQ-ACK feedback transmission in a next scheduled PUCCH after the DL symbol based on a deferred feedback configuration configured to define PUCCH content, wherein if the transmission of the deferred SPS PUCCH HARQ-ACK feedback overlaps the next scheduled PUCCH, the at least one process is further configured to:

determine that the next scheduled PUCCH includes HARQ and channel state information (CSI) resources for transmitting HARQ and CSI;

replace the CSI with the deferred SPS PUCCH HARQ-ACK feedback, wherein the CSI is dropped; and transmit PUCCH comprising the deferred SPS PUCCH HARQ-ACK feedback multiplexed with the PUCCH HARQ for the next scheduled PUCCH.

4. An apparatus for wireless communication at a user equipment (UE), comprising:

a memory; and at least one processor coupled to the memory and configured to:

determine to transmit physical uplink control channel (PUCCH) semi-persistent scheduling (SPS) hybrid automatic repeat request (HARQ) acknowledgment (ACK) (HARQ-ACK) feedback in response to a received semi-persistently scheduled physical downlink shared channel (PDSCH);

determine that transmission of the SPS PUCCH HARQ-ACK feedback would overlap with a downlink (DL) symbol, wherein the transmission of the SPS PUCCH HARQ-ACK feedback is deferred to another uplink (UL) symbol if the transmission of the SPS PUCCH HARQ-ACK feedback overlaps with the DL symbol; and transmit, based on the determination that the SPS PUCCH HARQ-ACK feedback would overlap with a DL symbol, a deferred SPS PUCCH HARQ-ACK feedback concurrently with a PUCCH HARQ-ACK feedback transmission in a next scheduled PUCCH after the DL symbol based on a deferred feedback configuration configured to define PUCCH content, wherein if the transmission of the deferred SPS PUCCH HARQ-ACK feedback overlaps the next scheduled PUCCH, the at least one process is further configured to:

determine that the next scheduled PUCCH only includes resources for a PUCCH HARQ-ACK feedback for the next scheduled PUCCH; and determine whether the deferred SPS PUCCH HARQ-ACK feedback can be multiplexed with the PUCCH HARQ-ACK feedback for the next scheduled PUCCH.

5. The apparatus of claim 4, wherein the at least one process is further configured to:

transmit concurrently the multiplexed SPS PUCCH HARQ-ACK feedback and PUCCH HARQ-ACK feedback in the scheduled PUCCH resource when both the SPS PUCCH HARQ-ACK feedback and the PUCCH HARQ-ACK feedback can be multiplexed into the same scheduled PUCCH resource.

6. The apparatus of claim 4, wherein the at least one process is further configured to:

replace the PUCCH HARQ-ACK feedback for the next scheduled PUCCH with the deferred SPS PUCCH HARQ-ACK feedback when the deferred SPS PUCCH HARQ-ACK feedback cannot be multiplexed with the PUCCH HARQ-ACK feedback for the next scheduled PUCCH; and transmit the deferred SPS PUCCH HARQ-ACK feedback in PUCCH resources for the next scheduled PUCCH, wherein the PUCCH HARQ-ACK feedback for the next scheduled PUCCH is dropped.

7. The apparatus of claim 4, wherein the at least one process is further configured to:

multiplex the PUCCH HARQ-ACK feedback for the next scheduled PUCCH and the deferred SPS PUCCH HARQ-ACK feedback;

determine an amount of PUCCH resources needed to transmit the PUCCH HARQ-ACK feedback for the next scheduled PUCCH multiplexed with the deferred SPS PUCCH HARQ-ACK feedback; and transmit the PUCCH HARQ-ACK feedback for the next scheduled PUCCH multiplexed with the deferred SPS PUCCH HARQ-ACK feedback in a new PUCCH resource, based on a PUCCH resource indicator (PRI), when both the SPS PUCCH HARQ-ACK feedback and the PUCCH HARQ-ACK feedback cannot be multiplexed into the same scheduled PUCCH resource.

8. The apparatus of claim 7, wherein the PRI comprises resources for a plurality of different payloads, wherein the PRI supports transmission of the PUCCH HARQ-ACK feedback for the next scheduled PUCCH multiplexed with the deferred SPS PUCCH HARQ-ACK feedback.

9. An apparatus for wireless communication at a user equipment (UE), comprising:

a memory; and at least one processor coupled to the memory and configured to:

determine to transmit physical uplink control channel (PUCCH) semi-persistent scheduling (SPS) hybrid automatic repeat request (HARQ) acknowledgment (ACK) (HARQ-ACK) feedback in response to a received semi-persistently scheduled physical downlink shared channel (PDSCH);

determine that transmission of the SPS PUCCH HARQ-ACK feedback would overlap with a downlink (DL) symbol, wherein the transmission of the SPS PUCCH HARQ-ACK feedback is deferred to another uplink (UL) symbol if the transmission of the SPS PUCCH HARQ-ACK feedback overlaps with the DL symbol; and transmit, based on the determination that the SPS PUCCH HARQ-ACK feedback would overlap with a DL symbol, a deferred SPS PUCCH HARQ-ACK feedback in one of a next set of available UL symbols based on a deferred feedback configuration configured to define PUCCH content.

10. The apparatus of claim 9, wherein the deferred SPS PUCCH HARQ-ACK feedback is transmitted in at least a first available UL symbol of the next set of available UL symbols with a same PUCCH format of the deferred SPS PUCCH HARQ-ACK feedback having similar physical resource blocks (PRBs) and a similar beam identifier (ID).

11. A method of wireless communication at a user equipment (UE), comprising:

determining to transmit physical uplink control channel (PUCCH) semi-persistent scheduling (SPS) hybrid automatic repeat request (HARQ) acknowledgment (ACK) (HARQ-ACK) feedback in response to a received semi-persistently scheduled physical downlink shared channel (PDSCH);

determining that transmission of the SPS PUCCH HARQ-ACK feedback would overlap with a downlink (DL) symbol, wherein the transmission of the SPS PUCCH HARQ-ACK feedback is deferred to another uplink (UL) symbol if the transmission of the SPS PUCCH HARQ-ACK feedback overlaps with the DL symbol; and transmitting, based on the determination that the SPS PUCCH HARQ-ACK feedback would overlap with a DL symbol, a deferred SPS PUCCH HARQ-ACK feedback concurrently with a PUCCH HARQ-ACK feedback transmission in a next dynamically scheduled PUCCH after the DL symbol based on a deferred feedback configuration configured to define PUCCH content, wherein if transmission of the deferred SPS PUCCH HARQ-ACK feedback overlaps the next scheduled PUCCH, the deferred feedback configuration is configured to:

determine that the next scheduled PUCCH includes channel state information (CSI) resources for transmitting CSI;

replace the CSI with the deferred SPS PUCCH HARQ-ACK feedback; and transmit the deferred SPS PUCCH HARQ-ACK feedback in the CSI resources concurrently with the PUCCH HARQ-ACK feedback in the scheduled PUCCH.

12. A method of wireless communication at a user equipment (UE), comprising:

determining to transmit physical uplink control channel (PUCCH) semi-persistent scheduling (SPS) hybrid automatic repeat request (HARQ) acknowledgment (ACK) (HARQ-ACK) feedback in response to a received semi-persistently scheduled physical downlink shared channel (PDSCH);

determining that transmission of the SPS PUCCH HARQ-ACK feedback would overlap with a downlink (DL) symbol, wherein the transmission of the SPS PUCCH HARQ-ACK feedback is deferred to another uplink (UL) symbol if the transmission of the SPS PUCCH HARQ-ACK feedback overlaps with the DL symbol; and transmitting, based on the determination that the SPS PUCCH HARQ-ACK feedback would overlap with a DL symbol, a deferred SPS PUCCH HARQ-ACK feedback concurrently with a PUCCH HARQ-ACK feedback transmission in a next scheduled PUCCH after the DL symbol based on a deferred feedback configuration configured to define PUCCH content, wherein if the transmission of the deferred SPS PUCCH HARQ-ACK feedback overlaps the next scheduled PUCCH, the deferred feedback configuration is configured to:

determine that the next scheduled PUCCH includes HARQ and channel state information (CSI) resources for transmitting HARQ and CSI;

replace the CSI with the deferred SPS PUCCH HARQ-ACK feedback, wherein the CSI is dropped; and transmit PUCCH comprising the deferred SPS PUCCH HARQ-ACK feedback multiplexed with the PUCCH HARQ for the next scheduled PUCCH.

13. A method of wireless communication at a user equipment (UE), comprising:

determining to transmit physical uplink control channel (PUCCH) semi-persistent scheduling (SPS) hybrid automatic repeat request (HARQ) acknowledgment (ACK) (HARQ-ACK) feedback in response to a received semi-persistently scheduled physical downlink shared channel (PDSCH);

determining that transmission of the SPS PUCCH HARQ-ACK feedback would overlap with a downlink (DL) symbol, wherein the transmission of the SPS PUCCH HARQ-ACK feedback is deferred to another uplink (UL) symbol if the transmission of the SPS PUCCH HARQ-ACK feedback overlaps with the DL symbol; and transmitting, based on the determination that the SPS PUCCH HARQ-ACK feedback would overlap with a DL symbol, a deferred SPS PUCCH HARQ-ACK feedback concurrently with a PUCCH HARQ-ACK feedback transmission in a next scheduled PUCCH after the DL symbol based on a deferred feedback configuration configured to define PUCCH content, wherein if the transmission of the deferred SPS PUCCH HARQ-ACK feedback overlaps the next scheduled PUCCH, the deferred feedback configuration is configured to:

determine that the next scheduled PUCCH only includes resources for a PUCCH HARQ-ACK feedback for the next scheduled PUCCH; and determine whether the deferred SPS PUCCH HARQ-ACK feedback can be multiplexed with the PUCCH HARQ-ACK feedback for the next scheduled PUCCH.

14. The method of claim 13, wherein the deferred feedback configuration is configured to:

transmit concurrently the multiplexed SPS PUCCH HARQ-ACK feedback and PUCCH HARQ-ACK feedback in the scheduled PUCCH resource when both the SPS PUCCH HARQ-ACK feedback and the PUCCH HARQ-ACK feedback can be multiplexed into the same scheduled PUCCH resource.

15. The method of claim 13, wherein the deferred feedback configuration is configured to:

replace the PUCCH HARQ-ACK feedback for the next scheduled PUCCH with the deferred SPS PUCCH HARQ-ACK feedback when the deferred SPS PUCCH HARQ-ACK feedback cannot be multiplexed with the PUCCH HARQ-ACK feedback for the next scheduled PUCCH; and transmit the deferred SPS PUCCH HARQ-ACK feedback in PUCCH resources for the next scheduled PUCCH, wherein the PUCCH HARQ-ACK feedback for the next scheduled PUCCH is dropped.

16. The method of claim 13, wherein the deferred feedback configuration is configured to:

multiplex the PUCCH HARQ-ACK feedback for the next scheduled PUCCH and the deferred SPS PUCCH HARQ-ACK feedback;

determine an amount of PUCCH resources needed to transmit the PUCCH HARQ-ACK feedback for the next scheduled PUCCH multiplexed with the deferred SPS PUCCH HARQ-ACK feedback; and transmit the PUCCH HARQ-ACK feedback for the next scheduled PUCCH multiplexed with the deferred SPS PUCCH HARQ-ACK feedback in a new PUCCH resource, based on a PUCCH resource indicator (PRI), when both the SPS PUCCH HARQ-ACK feedback and the PUCCH HARQ-ACK feedback cannot be multiplexed into the same scheduled PUCCH resource.

17. The method of claim 16, wherein the PRI comprises resources for a plurality of different payloads, wherein the PRI supports transmission of the PUCCH HARQ-ACK feedback for the next scheduled PUCCH multiplexed with the deferred SPS PUCCH HARQ-ACK feedback.

18. A method of wireless communication at a user equipment (UE), comprising:

determining to transmit physical uplink control channel (PUCCH) semi-persistent scheduling (SPS) hybrid automatic repeat request (HARQ) acknowledgment (ACK) (HARQ-ACK) feedback in response to a received semi-persistently scheduled physical downlink shared channel (PDSCH);

determining that transmission of the SPS PUCCH HARQ-ACK feedback would overlap with a downlink (DL) symbol, wherein the transmission of the SPS PUCCH HARQ-ACK feedback is deferred to another uplink (UL) symbol if the transmission of the SPS PUCCH HARQ-ACK feedback overlaps with the DL symbol; and transmitting, based on the determination that the SPS PUCCH HARQ-ACK feedback would overlap with a DL symbol, a deferred SPS PUCCH HARQ-ACK feedback in one of a next set of available UL symbols based on a deferred feedback configuration configured to define PUCCH content.

19. The method of claim 18, wherein the deferred SPS PUCCH HARQ-ACK feedback is transmitted in at least a first available UL symbol of the next set of available UL symbols with a same PUCCH format of the deferred SPS PUCCH HARQ-ACK feedback having similar physical resource blocks (PRBs) and a similar beam identifier (ID).

* * * * *